(12) United States Patent
Feria

(10) Patent No.: US 11,998,884 B1
(45) Date of Patent: Jun. 4, 2024

(54) METHOD FOR CONTROLLING LINGERATURE OF CHEMICAL REACTION

(71) Applicant: Erlan H. Feria, Princeton, NJ (US)

(72) Inventor: Erlan H. Feria, Princeton, NJ (US)

(*) Notice: Subject to any disclaimer, the term of this patent is extended or adjusted under 35 U.S.C. 154(b) by 0 days.

(21) Appl. No.: 18/548,419

(22) PCT Filed: Mar. 2, 2023

(86) PCT No.: PCT/US2023/063589
§ 371 (c)(1),
(2) Date: Aug. 30, 2023

(51) Int. Cl.
*B01J 19/00* (2006.01)

(52) U.S. Cl.
CPC .. *B01J 19/0033* (2013.01); *B01J 2219/00072* (2013.01); *B01J 2219/00184* (2013.01); *B01J 2219/002* (2013.01); *B01J 2219/00243* (2013.01)

(58) Field of Classification Search
CPC .... B01J 19/0013; B01J 8/0278; B01J 8/0285; B01J 19/0033; B01J 19/30; B01J 2208/00097; B01J 2208/00619; B01J 2219/00072; B01J 2219/00184; B01J 2219/30207; B01J 2219/30408; B01J 2219/30416; B01J 2219/30433; B01J 2219/30466; B01J 2219/002; B01J 2219/00243; G05D 23/1917
See application file for complete search history.

(56) References Cited

U.S. PATENT DOCUMENTS

| | | | |
|---|---|---|---|
| 4,536,380 A | 8/1985 | Pirkle, Jr. et al. | |
| 5,380,485 A | 1/1995 | Takahashi et al. | |
| 10,101,445 B2 | 10/2018 | Feria | |
| 2005/0246067 A1 | 11/2005 | Nieken et al. | |
| 2011/0060464 A1 | 3/2011 | Young | |
| 2011/0113993 A1 | 5/2011 | Esmalili et al. | |
| 2013/0090953 A1 | 4/2013 | Feria | |
| 2014/0214457 A1 | 7/2014 | Feria | |
| 2016/0027122 A1 | 1/2016 | Feria | |
| 2016/0091203 A1* | 3/2016 | Wang | F23N 1/022 700/274 |
| 2018/0347810 A1 | 12/2018 | Chandran et al. | |

(Continued)

FOREIGN PATENT DOCUMENTS

| | | |
|---|---|---|
| EP | 3181221 | 6/2017 |
| WO | WO2023048698 | 3/2023 |

OTHER PUBLICATIONS

ISA/US; International Search Report/Written Opinion dated Dec. 17, 2021 in related International application PCT/2021/051259 filed Sep. 21, 2021.

(Continued)

*Primary Examiner* — Shogo Sasaki
(74) *Attorney, Agent, or Firm* — Peter J. Mikesell; Schmeiser, Olsen & Watts, LLP

(57) ABSTRACT

A method for controlling lingerature of a chemical reaction. Changes in mass of a chemical reaction are monitored and are used to calculate a lingerature of the system. The reaction can be maintained at a desired lingerature ($\tau$) by selective addition or removal of heat or by adjusting the surface area the reactants are exposed to during the reaction. The disclosed method is useful for reactions that occur at non-equilibrium conditions where any measured lingerature would presume steady-state conditions.

10 Claims, 5 Drawing Sheets

(56) References Cited

U.S. PATENT DOCUMENTS

2018/0362862 A1* 12/2018 Gellaboina .......... G05B 13/042
2020/0219624 A1 7/2020 Feria

OTHER PUBLICATIONS

Feria, Erlan; First Principles of Linger-Thermo Theory, a Time-Complementary Duality in Physics, Inherently Lead to Average Mass of Star Particles and Organism Cells; 234th Meeting of the American Astronomical Society, Jun. 9-13, 2019; 2 pages.

Feria, Erlan H.; Matched processors for quantized control: A practical parallel-processing approach; Int. J. Control; 1985; pp. 695-713; vol. 42, No. 3.

Feria, Erlan H.; Novel Lingerdynamics Ectropies are Revealed as as Time Duals of Thermodynamics Entropies; IEEE International Conference on Systems, Man, and Cybernetics, Oct. 9-12, 2011; pp. 3378-3385.

Feria, Erlan H.; The Flexible Phase Entropy and its Rise from the Universal Cybernetics Duality; 2014 IEEE International Conference on Systems, Man, and Cybernetics Oct. 5-8, 2014; pp. 3221-3228.

Feria, Erlan H.; Power Centroid Radar and its Rise from the Universal Cybernetics Duality; Sensing Technologies + Applications; May 28, 2014; DOI:10.1117/12.2059153.

Feria, Erlan H.; Maximizing the efficiency and affordability of high-performance radar; SPIE; Jul. 7, 2014; 3 Pages; DOI: 10.1117/2.1201407.005429.

Feria, Erlan H.; Linger Thermo Theory: Simplifying the Finding of the Entropy of Mediums with Applications that Span from Astrophysics to Human Lifespan; 2016 IEEE International Conference on Smart Cloud; Nov. 18-20, 2016; pp. 85-102; DOI 10.1109/SmartCloud.2016.57.

ISA/US; International Search Report/Written Opinion dated Jul. 12, 2023 in corresponding International application PCT/2023/063589 filed Mar. 2, 2023.

* cited by examiner

METHOD FOR CONTROLLING LINGERATURE OF CHEMICAL REACTION

BACKGROUND OF THE INVENTION

The subject matter disclosed herein relates to lingerature (i.e. length of time during which stress conditions can be deemed constant) control systems and, more particularly, to lingerature control systems with non-equilibrium conditions.

During many chemical and biological processes, proper control of lingerature of a system is an important factor. Conventionally, a given chemical reaction is optimized by trial and error. For example, the reaction may be performed many times at slightly different experimental conditions in order to determine the desired conditions that optimizes the yield of a particular chemical reaction. While this solution may be adequate for many situations, it relies on the system in question being in a steady state, equilibrium condition.

Some systems are non-equilibrium systems that deviate from the steady-state assumptions to such an extent that merely using trial and error to optimize conditions is not adequate. An improved method for controlling the lingerature of a system is therefore desired. The discussion above is merely provided for general background information and is not intended to be used as an aid in determining the scope of the claimed subject matter.

SUMMARY

A method for controlling lingerature of a chemical reaction is disclosed. Changes in mass of a chemical reaction are monitored and are used to calculate the lingerature of a system. The reaction can be maintained at a desired lingerature ($\tau$) by either (1) selective addition or removal of heat or (2) adjusting the surface area the reactants experience during the reaction. The disclosed method is useful for reactions that occur at non-equilibrium conditions where any measured lingerature would presume steady-state conditions.

In a first embodiment, a method for controlling lingerature of a chemical reaction is provided. The method comprising steps of: a) determining an initial system mass (M) of a chemical system which performs a chemical reaction between reactants in a solvent to produce products, wherein at least one of the products is an exiting product that is a gaseous product or a precipitation product, the chemical reaction having a desired temperature (T), a desired lingerature ($\tau$) and the chemical system having a specific heat capacity (SHC); b) adding the reactants and the solvent to a vessel, thereby initiating the chemical reaction; c) allowing the exiting product to exit the vessel; d) measuring a current system mass ($M_i$) for an $i^{th}$ iteration of the method; e) determining an exited mass ($E_i$) of the exiting product that exited during step c) based on the current system mass ($M_i$); f) calculating a change in reactant mass ($\Delta M_i$) that occurred during the $i^{th}$ iteration based on the exited mass ($E_i$); g) calculating a dynamic lingerature ($\tau_i$) according to:

$$\tau_i = \beta\left(\frac{M - \Delta M_i}{M}\right)^2 \tau$$

if the chemical reaction is an exothermic reaction or according to:

$$\tau_i = 2\tau - \beta\left(\frac{M - \Delta M_i}{M}\right)^2 \tau$$

if the chemical reaction is an endothermic reaction, wherein $\beta$ is a number between 0.8 and 1.2; h) calculating a change in lingerature ($\Delta \tau_i$) based on the desired lingerature ($\tau$) and the dynamic lingerature ($\tau_i$); i) adding additional mass to the vessel in an amount equal to the exited mass ($E_i$); and j) adjusting a temperature of the chemical system b adding or removing an amount of heat ($\Delta Q_i$) according to:

$$\Delta Q_i = SHC \times M \times \left(1 - \alpha\sqrt{\frac{1 + \Delta\tau_i/\tau}{\beta}}\right)T$$

if the chemical reaction is an exothermic reaction or according to:

$$\Delta Q_i = SHC \times M \times \left(\alpha\sqrt{\frac{1 + \Delta\tau_i/\tau}{\beta}} - 1\right)T$$

if the chemical reaction is an endothermic reaction, wherein $\alpha$ is a number between 0.8 and 1.2.

In a second embodiment, a method for controlling lingerature of a chemical reaction is provided. The method comprising steps of: a) determining an initial system mass (M) of a chemical system which performs a chemical reaction between reactants in a solvent to produce products, wherein at least one of the products is an exiting product that is a gaseous product or a precipitation product, the chemical reaction having a desired temperature (T), a desired lingerature ($\tau$); b) adding the reactants and the solvent to a vessel, thereby initiating the chemical reaction; c) allowing the exiting product to exit the vessel; d) measuring a current system mass ($M_i$) for an $i^{th}$ iteration of the method; e) determining an exited mass ($E_i$) of the exiting product that exited during step c) based on the current system mass ($M_i$); f) calculating a change in reactant mass ($\Delta M_i$) that occurred during the $i^{th}$ iteration based on the exited mass ($E_i$); g) adding or removing an insoluble mass to the vessel in an amount to provide a change in surface area ($\Delta A_i$) according to:

$$\Delta A_i = \left(\beta\left(\frac{M_i}{M}\right)^2 - 1\right)A$$

if the chemical reaction is an exothermic reaction or according to:

$$\Delta A_i = \left(1 - \beta\left(\frac{M_i}{M}\right)^2\right)A$$

if the chemical reaction is an endothermic reaction, wherein $\beta$ is a number between 0.8 and 1.2, and h) adding a soluble mass in an amount sufficient to restore the initial system mass (M), the amount of the soluble mass determined based on the exited mass ($E_i$) and the insoluble mass.

This brief description of the invention is intended only to provide a brief overview of subject matter disclosed herein according to one or more illustrative embodiments and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
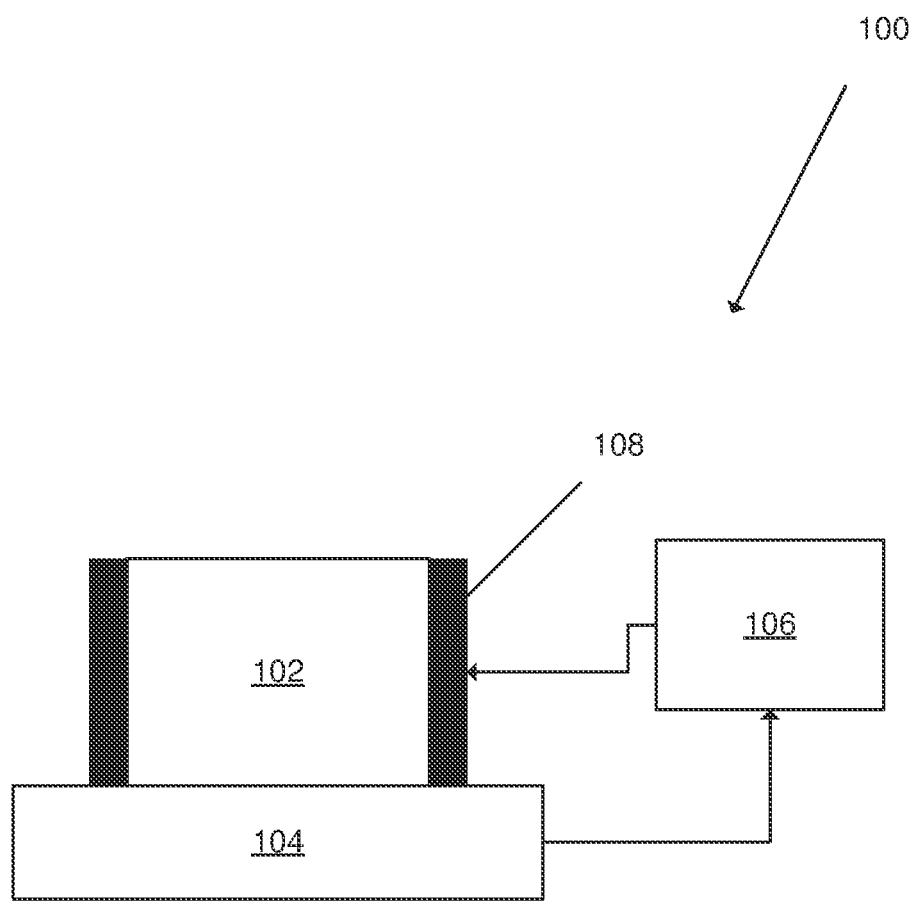
FIG. 1 is a schematic diagram of one system for implementing the disclosed method.

The disclosed system pertains to lingerature control systems and specifically pertains to systems that control non-equilibrium systems whose mass changes over the course of a chemical reaction. The disclosed method is used with chemical reactions wherein a product, such as a gaseous or solid product, exits the chemical reaction vessel over the course of the reaction. As used in this specification, the term lingerature refers to a length of time during which the chemical reaction can be considered to have a constant degree of stress.

In a first embodiment, a calculated lingerature ($\tau_i$) of a system at non-equilibrium conditions during an $i^{th}$ iteration of the method is calculated according to one of the following two equations:

$$\tau_i = \beta\left(\frac{M - \Delta M_i}{M}\right)^2 \tau, \text{ exothermic} \quad (1)$$

$$\tau_i = 2\tau - \beta\left(\frac{M - \Delta M_i}{M}\right)^2 \tau, \text{ endothermic} \quad (2)$$

wherein $\tau$ is a desired lingerature (i.e. a target lingerature), M is an initial system mass of the entire chemical system within a vessel, $\Delta M_i$ is a change in reactant mass during an $i^{th}$ iteration, and $\beta$ is a positive number that is near 1 (e.g. 0.8 to 1.2). Detailed discussions of establishing values for $\beta$ and the desired lingerature ($\tau$) are provided elsewhere in this disclosure. By calculating the $i^{th}$ iteration change in reactant mass ($\Delta M_i$), one can then find a calculated lingerature ($\tau_i$) at non-equilibrium.

A change in heat ($\Delta Q_i$) is added or removed to maintain the desired lingerature ($\tau$) according to one of the following two equations:

$$\Delta Q_i = SHC \times M \times \left(1 - \alpha\sqrt{\frac{(1 + \Delta\tau_i/\tau)}{\beta}}\right)T, \text{ exothermic} \quad (3)$$

$$\Delta Q_i = SHC \times M \times \left(\alpha\sqrt{\frac{(1 - \Delta\tau_i/\tau)}{\beta}} - 1\right)T, \text{ endothermic} \quad (4)$$

wherein $\Delta\tau_i$ is a change in lingerature that occurred during the $i^{th}$ iteration (i.e. $\Delta\tau_i = \tau_i - \tau$), SHC is a specific heat capacity of the system, $\alpha$ is a positive number that is near 1 (e.g. 0.8 to 1.2) and T is a target temperature of the chemical reaction. A detailed discussion of establishing a value for $\alpha$ is provided elsewhere in this disclosure.

In a second embodiment, the surface area experienced by the reactants (which changes linger viscosity) is changed to maintain the desired lingerature ($\tau$).

$$\Delta A_i = \left(\beta\left(\frac{M_i}{M}\right)^2 - 1\right)A, \text{ exothermic,} \quad (5)$$

$$\Delta A_i = \left(1 - \beta\left(\frac{M_i}{M}\right)^2\right)A, \text{ endothermic,} \quad (6)$$

wherein $\Delta A_i$ is a change in frictional surface area, A is an initial surface area, M is an initial system mass, $M_i$ is a current system mass during an $i^{th}$ iteration.

FIG. 1 depicts a system 100 comprising a chemical reaction vessel 102, a mass sensor 104 that provides the current system mass ($M_i$) to a computer 106. The computer 106 controls a heat adjustor 108 which is configured to selectively heat or cool the chemical reaction vessel 102. In one embodiment, the chemical reaction vessel 102 is thermally insulated using conventional insulating methods to minimize heat loss to the ambient environment. The mass sensor 104 may be, for example, a mass balance. The heat adjustor 108 may include conventional heating or cooling elements and the computer 106 selectively actuates the heat adjustor 108 to control the joules of heat that is added or removed.

Figure 2:
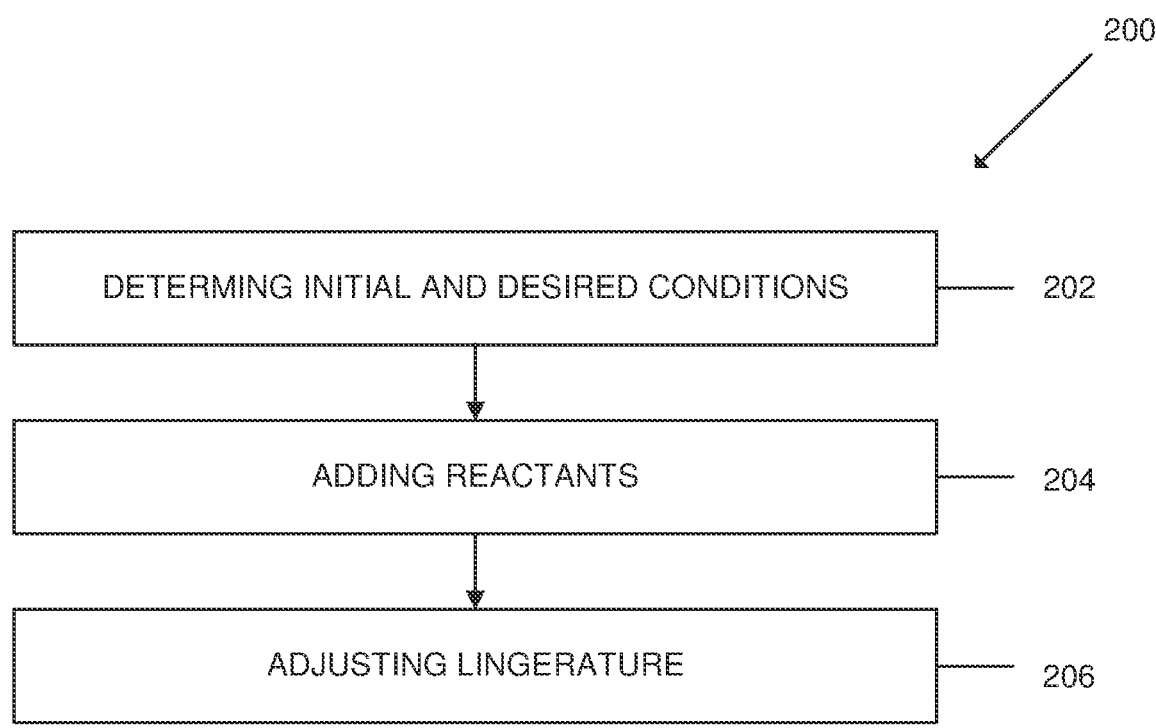
FIG. 2 is a flow diagram depicting one embodiment of the disclosed method.

Referring to FIG. 2, a method 200 is disclosed for controlling a lingerature of a chemical reaction by adjusting heat. The method 200 comprises step 202, wherein the initial and desired conditions are determined. For example, the initial system mass (M) may be determined. The specific heat capacity of the chemical system is also determined. In the hypothetical example that follows, the chemical system has a specific heat capacity of 4.184 $Jg^{-1}K^{-1}$. The values of $\alpha$ and $\beta$ are specific to a particular chemical reaction and are also established in step 202. In the running example, α=1 and β=1. The desired conditions are also determined in step 202. For example, the desired temperature (T) may be determined by optimizing the yield of a particular chemical product by repeatedly conducting the chemical reaction for a variety of different reaction temperatures. In the hypothetical example used in this disclosure, the desired temperature (T) is 353 K. Likewise, a desired lingerature (τ) is determined in step 202. A detailed discussion of the selection of the desired lingerature (τ) value is found elsewhere in this disclosure. In the following hypothetical example, τ is 275.5 sec.

The initial system mass (M) includes the reactants, solvent and inert components but does not include products. By way of illustration, and not limitation, a given chemical reaction may involve permitting predetermined quantities of reactants A and B to react in a solvent to form a desired product C and byproducts D and E. In this example byproduct D is a gaseous byproduct which exits the reaction vessel as it forms.

$$A+2B \rightarrow 2C+D(g)+E \qquad (7)$$

For example, one may calculate that 1300 g of reactant A (molar mass 100.0 g mol$^{-1}$) will react with 910 g of reactant B (molar mass 35.0 g mol$^{-1}$) in the presence of 13,000 g of a solvent. The initial system mass (M) is therefor 15,210 g.

In step 204, reactants are added to a vessel, such as vessel 102, which initiates the chemical reaction. In step 206, the lingerature is adjusted based on the amount of the exiting product (e.g. product D) that exits the vessel. Lingerature may be adjusted by heat adjustment or by surface area adjustment.

Exothermic Example—Heat Adjustment

Figure 3:
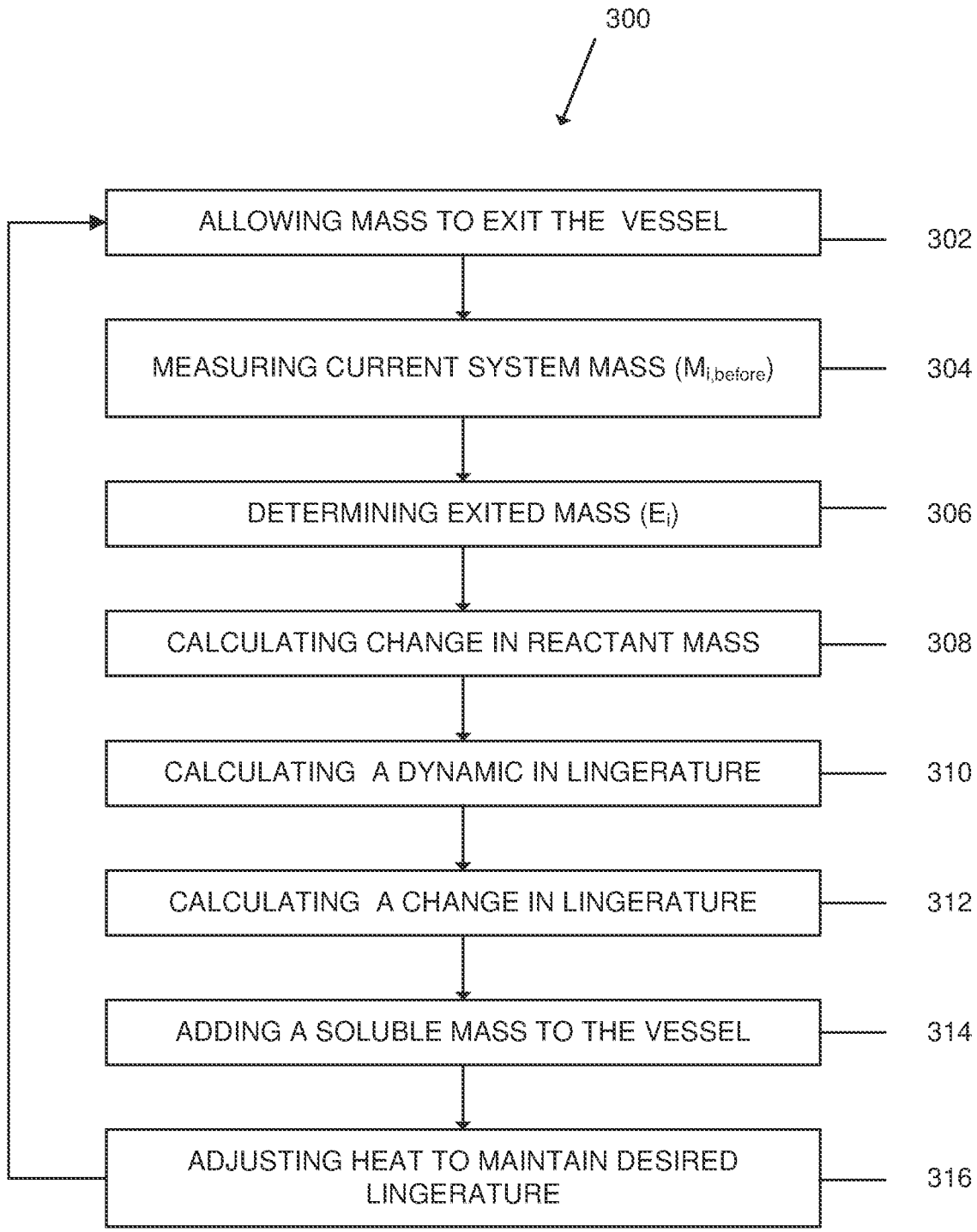
FIG. 3 is a flow diagram depicting one embodiment of a method for adjusting lingerature.

FIG. 3 depicts a method 300 for executing step 206. Method 300 will initially be described in terms of an exothermic example. In step 302, a quantity (i.e. some or all) of one product is allowed to exit the chemical reaction vessel during the course of the chemical reaction. The exiting of this $i^{th}$ iteration product permits one to calculate the $i^{th}$ iteration change in reactant mass ($\Delta M_i$) that gave rise to this exited mass ($E_i$).

In step 304, the current system mass ($M_i$) of the $i^{th}$ iteration is measured with the mass sensor 104. The current system mass ($M_i$) includes the entire contents of the vessel such as reactants, solvent, inert components and any products that have not exited the vessel. Because the current system mass ($M_i$) is measured before the mass of the vessel is adjusted to match the initial system mass (M) (step 314) it may be referred to as $M_{i,before}$.

In step 306, the exited mass ($E_i$) that exited the vessel during the $i^{th}$ iteration is determined by comparing the current system mass ($M_i$) at the $i^{th}$ iteration to the initial system mass (M). In the current example, this corresponds to the mass of product D that has exited the vessel. For example, if the initial system mass (M) was 15,210 g, and the first iteration (i=1) system mass ($M_{1,before}$) is 15,070 (as measured before the addition of any mass), then the exited mass ($E_1$) is found to be 140 g.

$$E_i = M - M_{i,before} \qquad (8)$$

$$E_1 = 15,210 \text{ g} - 15,070 \text{ g} = 140 \text{ g} \qquad (9)$$

In step 308, the change in reactant mass ($\Delta M_i$) is calculated for the $i^{th}$ iteration based on the exited mass ($E_i$). For example, given $E_1$=140 g, the stoichiometry of the reaction (see equation 7) permits one to calculate that 400 g of reactant A and 280 g of reactant B was consumed:

$$\Delta M_A = \qquad (10)$$

$$\frac{140 \text{ g } D}{1} \frac{\text{mole } D}{35 \text{ g } D} \frac{1 \text{ mole } A}{1 \text{ mole } D} \frac{100.0 \text{ g } A}{\text{mole } A} = 400 \text{ g of reactant } A \text{ consumed}$$

$$\Delta M_B = \qquad (11)$$

$$\frac{140 \text{ g } D}{1} \frac{\text{mole } D}{35 \text{ g } D} \frac{2 \text{ mole } B}{1 \text{ mole } D} \frac{35.0 \text{ g } B}{\text{mole } B} = 280 \text{ g of reactant } B \text{ consumed}$$

The change in reactant mass ($\Delta M_i$) at the $i^{th}$ iteration, where i=1, is therefore:

$$\Delta M_i = \Delta M_{reactants} = \Delta M_A + \Delta M_B \qquad (12)$$

$$\Delta M_1 = 400 \text{ g} + 280 \text{ g} = 680 \text{ g reactants consumed} \qquad (13)$$

In step 310, a dynamic lingerature ($\tau_i$) is calculated for the $i^{th}$ iteration of this exothermic example according to:

$$\tau_i = \beta \left( \frac{M - \Delta M_i}{M} \right)^2 \tau, \text{ exothermic} \qquad (14a)$$

In the running example (β=1, M=15,210 g, $\Delta M_i$=680 g, τ=275.5 sec) the reaction is exothermic. Accordingly, $\tau_i$ is found by:

$$\tau_i = \beta \left( \frac{M - \Delta M_i}{M} \right)^2 \tau, \text{ exothermic} \qquad (14b)$$

$$\tau_i = 1 \left( \frac{15.210 \text{ g} - 680 \text{ g}}{15.210 \text{ g}} \right)^2 275.5 \text{ sec} = 251.4 \text{ sec} \qquad (14c)$$

In step 312, a change in lingerature ($\Delta \tau_i$) is calculated according to:

$$\Delta \tau_i = \tau_i - \tau \qquad (14d)$$

$$\Delta \tau_i = 251.4 \text{ sec} - 275.5 \text{ sec} = -24.1 \text{ sec} \qquad (14e)$$

In step 314, a soluble mass is added in an amount equal to the exited mass ($E_i$). This maintains the initial system mass (M) as a constant. In one embodiment, the soluble mass is in the form of additional solvent. In another embodiment, the soluble mass is in the form of additional reactants. For example, 140 g of reactants may be added to restore the system to the initial system mass (M). Given the stoichiometry of equation 7, this corresponds to 82.36 g of reactant A and 57.64 g of reactant B found by examining the molar mass ratio of reactants A:B.

$$\frac{\text{molar mass of } A \times \text{molar ratio}}{\text{molar mass of } B \times \text{molar ratio}} = \frac{100.0 \times 1}{35.0 \times 2} = \frac{1.429}{1.00} \qquad (15)$$

The temperature of the soluble mass is preadjusted so as to not negatively impact the temperature of the chemical system. In one embodiment, the temperature of the soluble mass is preadjusted so that its addition simultaneously performs step 316 and heats or cools the chemical system as appropriate.

In step 316, a temperature of the chemical system is adjusted for this exothermic example by removing an amount of heat ($\Delta Q_i$) according to:

$$\Delta Q_i = SHC \times M \times \left(1 - \alpha\sqrt{\frac{(1 + \Delta\tau_i/\tau)}{\beta}}\right)T, \text{ exothermic} \quad (16)$$

In the running example ($\alpha=1$, $\beta=1$, M=15,210 g, $\Delta\tau_i=-24.1$ sec, $\tau=275.5$ sec, T=353 K, SHC=4.184 Jg$^{-1}$K$^{-1}$) the reaction is exothermic. Accordingly, $\Delta Q_i$ is found by:

$$\Delta Q_i = SHC \times M \times \left(1 - \alpha\sqrt{\frac{(1 + \Delta\tau_i/\tau)}{\beta}}\right)T, \text{ exothermic} \quad (17)$$

$$\Delta Q_i = \left(4.184 \text{ Jg}^{-1}\text{K}^{-1}\right) \times (15.210 \text{ g}) \times \quad (18)$$

$$\left(1 - 1\sqrt{\frac{(1 + (-24.1 \text{ sec})/275.5 \text{ sec})}{1}}\right) 353\text{K}, \Delta Q_i = 1.158 \times 10^6 \text{ J}$$

This shows the chemical system has increased in energy by $1.158 \times 10^6$ J and, accordingly, this amount heat is removed in step 316. The heat adjustor 108 may be actuated to provide a corresponding amount of cooling. The method 300 may be continued by returning to step 302.

Endothermic Example—Heat Adjustment

Conversely, if the reaction is endothermic, steps 310 and 312 are different, but the method depicted in FIG. 3 is otherwise substantially the same.

For example, in step 310, a dynamic lingerature ($\tau_i$) is calculated ($\beta=1$, M=15,210 g, $\Delta M_i$=680 g, $\tau=275.5$ sec) for an endothermic reaction according to:

$$\tau_i = 2\tau - \beta\left(\frac{M - \Delta M_i}{M}\right)^2 \tau, \text{ endothermic} \quad (19)$$

$$\tau_i = 2(275.5) - 1\left(\frac{15.210 \text{ g} - 680 \text{ g}}{15.210 \text{ g}}\right)^2 275.5 \text{ sec, endothermic} \quad (20)$$

$$\tau_i = 300.0 \text{ sec} \quad (21)$$

In step 312, a positive change in lingerature ($\Delta\tau_i$) is calculated according to:

$\Delta\tau_i = \tau_i - \tau$ $\Delta\tau_i = 300.0 \text{ sec} - 275.5 \text{ sec} = 24.1 \text{ sec}$ In step 316, a temperature of the chemical system ($\alpha=1$, $\beta=1$, M=15,210 g, $\Delta\tau_i=24.1$ sec, $\tau=275.5$ sec, T=353 K, SHC=4.184 Jg$^{-1}$K$^{-1}$) is adjusted by adding or removing an amount of heat ($\Delta Q_i$) according to:

$$\Delta Q_i = SHC \times M \times \left(\alpha\sqrt{\frac{(1 - \Delta\tau_i/\tau)}{\beta}} - 1\right)T, \text{ endothermic} \quad (22)$$

$$\Delta Q_i = \left(4.184 \text{ Jg}^{-1}\text{K}^{-1}\right) \times (15.210 \text{ g}) \times \quad (23)$$

$$\left(1\sqrt{\frac{(1 + (-24.1 \text{ sec})/275.5 \text{ sec})}{1}} - 1\right) 353\text{K}, endo$$

$\Delta Q_i = -1.158 \times 10^6$ J

This shows the chemical system has decreased in energy by $1.158 \times 10^6$ J and, accordingly, this amount heat is added in step 316. The heat adjustor 108 may be actuated to provide a corresponding amount of heating.

Exothermic Example—Surface Area Adjustment

Figure 5:
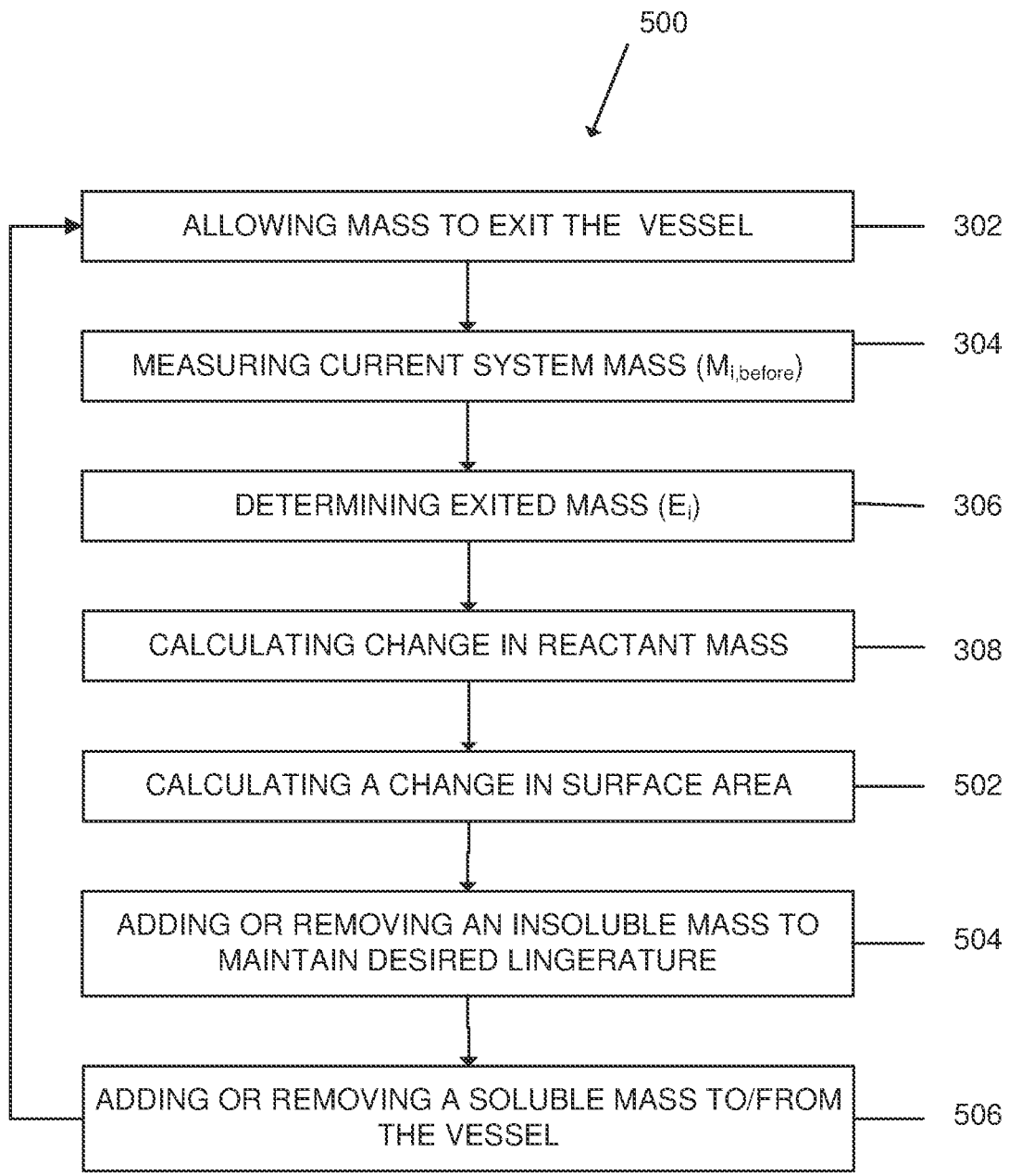
FIG. 5 is a flow diagram depicting another embodiment of a method for adjusting lingerature.

In another embodiment, lingerature is adjusted by adjusting the surface area the reactants experience during the reaction. Referring to FIG. 5, a method 500 is depicted that is another method for performing step 206 of FIG. 2. Method 500 is substantially similar to select steps of method 300 (see FIG. 3) except in that step 502 replaces steps 310 and 312 and step 316 is omitted. Step 504 (addition of an insoluble mass) is new. Step 506 (addition of a soluble mass) is similar to step 314 but differs in the amount of soluble mass being adjusted to compensate for the insoluble mass.

In the following example, an exothermic reaction is used. In step 502, a change in frictional surface area ($\Delta A_i$) is found according to:

$$\Delta A_i = \left(\beta\left(\frac{M_i}{M}\right)^2 - 1\right)A, \text{ exothermic,} \quad (24)$$

wherein A is an initial surface area, M is an initial system mass, $M_i$ is a current system mass during an $i^{th}$ iteration.

Referring again to the aforementioned exothermic example ($\beta=1$, M=15,210 g, $M_i$=15,070 g, $E_1$=140 g) the initial surface area (A) of the vessel is found to be 3,414 cm$^2$ (0.3414 m$^2$). The change in surface area to restore the lingerature is therefore found according to:

$$\Delta A_i = \left(\beta\left(\frac{M_i}{M}\right)^2 - 1\right)A, \text{ exothermic,} \quad (25)$$

$$\Delta A_i = \left(1\left(\frac{15.170 \text{ g}}{15.210 \text{ g}}\right)^2 - 1\right)0.3414 \text{ m}^2, \text{ exothermic,} \quad (26)$$

$\Delta A_i = -0.00626 \text{ m}^2$

In step 504, an insoluble mass is added to the vessel that provides a surface area to compensate for the negative change in frictional surface area ($\Delta A_i$) found in step 502. The insoluble mass increases the surface area experienced by the reactants. One example of a highly porous, insoluble media is activated carbon which can be prepared to provide different amounts of surface area. In other embodiments, insoluble beads (e.g. silica, glass, polymeric, etc.) with lower porosity are added that change the exposed surface area. In still other embodiments, a rod is inserted into the chemical system to a predetermined depth such that the depth of insertion controls the surface area of the rod that is exposed to the system. In the following example spherical glass beads (radius 1 mm) provide a surface area of $1.26 \times 10^{-5}$ m$^2$ per bead.

Given the surface area provided by the exemplary glass beads, the amount of added beads is:

$$\left(\frac{1 \text{ bead}}{1.26 \times 10^{-5} \text{ m}^2}\right)\left(\frac{0.00626 \text{ m}^2}{1}\right) = 496 \text{ beads} \quad (27)$$

A constant system mass (M) is maintained in step 506, wherein a sufficient amount of soluble mass (e.g. additional reactants, solvent, etc.) is added. In the running example, 140 g total mass (i.e. the exited mass ($E_i$)) is added over steps 504 and 506 and consists of the mass of the 496 beads (2.05 g when the beads have a density of 1.03 g per mL) plus a sufficient amount of the soluble mass to total 140 g. By replacing a soluble mass (which does not provide a surface area) with an insoluble mass (which does provide a surface area) the surface area is altered while maintaining a constant system mass. The method 500 may be repeated by returning to step 302.

Endothermic Example—Surface Area Adjustment

In the following example, an endothermic reaction is used. In step 502, a change in frictional surface area ($\Delta A_i$) is found according to:

$$\Delta A_i = \left(1 - \beta\left(\frac{M_i}{M}\right)^2\right) A, \text{ endothermic}, \tag{28}$$

wherein A is an initial surface area, M is an initial system mass, $M_i$ is a current system mass during an $i^{th}$ iteration.

Referring again to the aforementioned exothermic example ($\beta=1$, M=15,210 g, $M_i$=15,070 g, $E_1$=140 g) the initial surface area (A) of the vessel is found to be 3,414 cm² (0.3414 m²). The change in surface area to restore the lingerature is therefore found according to:

$$\Delta A_i = \left(1 - \beta\left(\frac{M_i}{M}\right)^2\right) A, \text{ endothermic}, \tag{29}$$

$$\Delta A_i = \left(1 - 1\left(\frac{15,070 \text{ g}}{15,210 \text{ g}}\right)^2\right) 0.3414 \text{ m}^2, \text{ endothermic}, \tag{30}$$

$$\Delta A_i = 0.006256 \text{ m}^2$$

In step 504, an insoluble mass is removed from the vessel to compensate for the positive change in frictional surface area ($\Delta A_i$) found in step 502. To permit this removal, the vessel was pre-loaded with an insoluble mass (e.g. glass beads) before the chemical reaction began. A corresponding amount of the insoluble mass is removed from the vessel in step 504 (e.g. 496 glass beads are removed).

A constant system mass is still maintained in step 506 by compensating for the mass that exited the system. Accordingly, soluble mass (e.g. additional reactants or solvent) are also added in step 506, in addition to the insoluble mass. By replacing an insoluble mass (which provided a surface area) and with a soluble mass (e.g. solvent or reactants) the surface area is altered while maintaining a constant system mass.

Establishing $\tau$

Figure 4:
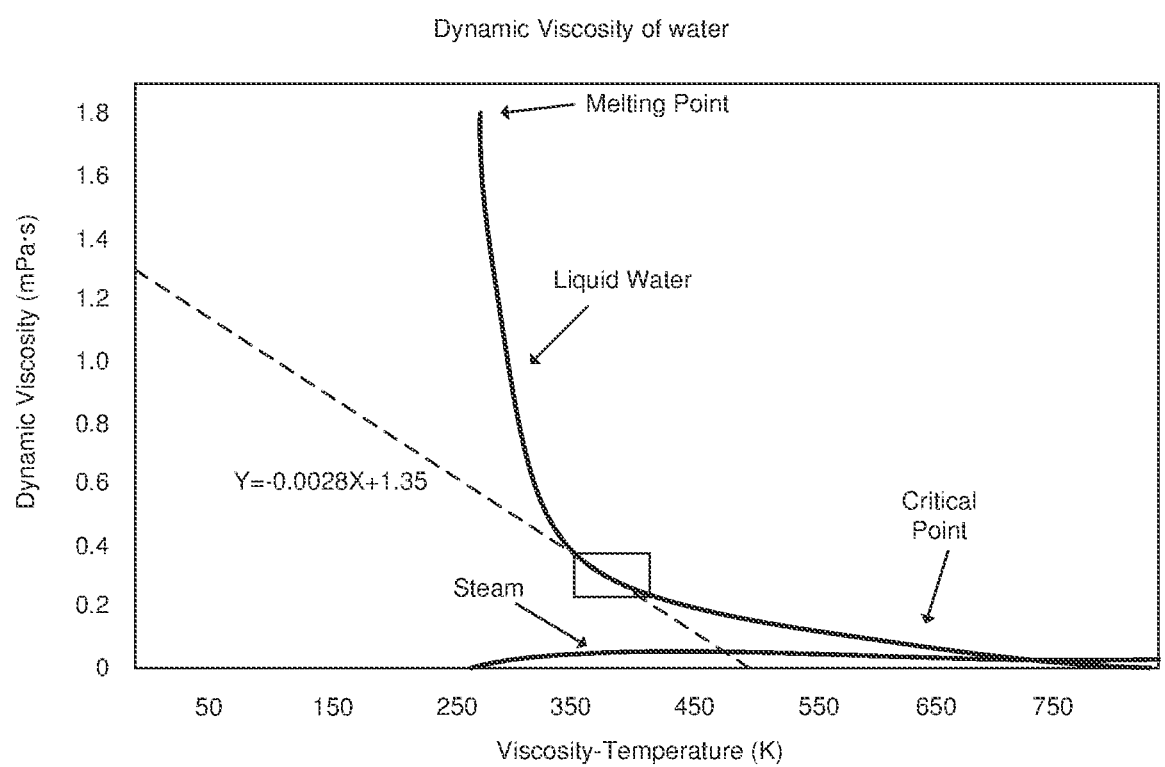
FIG. 4 is a graph of dynamic viscosity of water versus viscosity-temperature.

The desired lingerature ($\tau$) value is related to the stress experienced by the chemical system. The desired lingerature ($\tau$) may be found from an experimentally-obtained plot of dynamic viscosity $\vartheta(\tau)$ versus viscosity-temperature ($T(\vartheta)$). In one embodiment, the plot for the solvent is used to approximate the chemical system. For example, FIG. 4 depicts a plot of dynamic viscosity $\vartheta(\tau)$ versus viscosity-temperature ($T(\vartheta)$) for water. In the running example, the desired temperature (T) is 353 K. A range of temperatures surrounding the desired temperature (T) is selected. For example, a range of $\mp 10\%$ of the desired temperature (T) may be selected (e.g. 318 K ($T_{min}$) to 388 K ($T_{max}$)). This range may be approximated by a regression equation (e.g. linear regression). In FIG. 4 the equation of the corresponding line is $\vartheta(\tau)=-0.0028$ mPa K$^{-1}$($T(\vartheta)$)+1.35 mPa in the form y=mx+b, wherein y is the dynamic viscosity $\vartheta(\tau)$, x is the viscosity-temperature ($T(\vartheta)$), b is the y-intercept and m is the slope.

In a first embodiment, the desired lingerature ($\tau$) is found based on the desired temperature (T) according to:

$$\tau = \frac{b + m \times T}{\frac{GM^2}{rVN_{DoF}}} \tag{31}$$

wherein m is the slope, b is the y-intercept, T is the temperature of the chemical reaction, M is the initial mass of the system, G is the gravitational constant ($6.6743 \times 10^{-11}$ m³kg⁻¹s⁻²), $N_{DoF}$ is the number of degrees of freedom of the solvent molecules (e.g. 5 for water), V is the volume of the vessel and r is the radius of spherical volume that corresponds to the volume (V). When the desired lingerature ($\tau$) is found in this manner it may also be referred to as the normal lingerature ($\tau_N$).

For example, a hypothetical vessel is a cylinder with a radius of 13 cm and a height of 28.8 cm thus characterized by a volume (V) of 15,290.75 cm³ or 0.01529 m³ in SI units. The spherical radius (r) for the vessel is derived from the expression $(3V/4\pi)^{1/3}$ and is 0.15386 m. When the temperature (T) is 353 K, the desired lingerature ($\tau$) is therefore 275.5 sec.

In a second embodiment, a lingerature is experimentally selected within a range of potential lingerature values established based on the equation of the line. Multiple experiments are run at the desired temperature (T) while the lingerature is varied within this range. The yield for each experiment is measured and a desired lingerature ($\tau$) is found based on this yield optimization. A range of acceptable desired lingerature ($\tau$) values is within a range given by:

$$\tau_{max} = \frac{b + m \times T_{min}}{\frac{GM^2}{rVN_{DoF}}} \tag{32a}$$

$$\tau_{min} = \frac{b + m \times T_{max}}{\frac{GM^2}{rVN_{DoF}}} \tag{32b}$$

In the running example, this results in a range of lingeratures between 201 sec and 350 sec. The chemical reaction is then conducted (i.e. method 300 is performed) at multiple lingeratures, but constant temperature, within this range while the resulting yield is measured. By optimizing yield in this manner, the desired lingerature ($\tau$) is found. In other embodiments, criteria other than yield optimization are used to find the desired lingerature ($\tau$) provided that the desired lingerature ($\tau$) falls within the range given by $\tau_{min}$ and $\tau_{max}$. In one such embodiment, the desired lingerature ($\tau$) is within 5% of the normal lingerature ($\tau_N$).

Establishing $\alpha$

The $\alpha$ value for a given chemical reaction is related to its thermal behavior. A statistical value for $\alpha$ can be readily found. For instance, it can be found for a hypothetical chemical reaction, such as equation 7 where a gas D(g) is being continuously released, using the following method:

$$\alpha = \frac{\sum_{i=1}^{N} \alpha_i}{N} \approx 1 \tag{33}$$

$$\alpha_i = \frac{\left(\frac{M}{T}\right)}{\left(\frac{M - \Delta M_i}{T - |\Delta T_i|}\right)} \tag{34}$$

where the equation denotes the averaging of N repeated reactions of the chemical reaction. These reactions yield N realizations for α specified as {$α_i$: i=1, ..., N} where $α_i$ is found at each measuring time ($t_i$) where: a) M is the initial system mass and T is the target temperature; b) $ΔM_i$ is the change in reactant mass during the time interval $Δt_i$ that starts at the beginning of the chemical reaction; and c) $|ΔT_i|$ is the magnitude of the temperature change experienced during the time interval $Δt_i$.

A set of suitable reactant time intervals {$t_i$: i=1, ..., N} is selected to conduct the N independent experiments. The $i^{th}$ experiment yields a value for $ΔM_i$ that can be experimentally determined using a mass sensor that measures the mass of the gas product D that exists the vessel during the time interval $Δt_i$. The magnitude of the temperature change of the vessel during the time interval $Δt_i$ is measured using, for instance, a thermocouple. The reactions are performed under conditions where the vessel is highly thermally insulated to obtain the best results.

Tables 1-3 present values and physical characteristics pertaining to a hypothetical chemical reaction example. This example examines the results derived for the generic chemical reaction given by equation 7 where the statistical value for α is found to be close to one. The hypothetical example considers the case where: a) the solvent mass has the constant value of 13,000 g; b) the initial mass for the reactant A is 1,300 g; c) the initial mass of the reactant B is 910 g; d) the initial system mass M in the vessel is 15,210 g; e) the target temperature T in the vessel is 353 K. At four different times ($t_1$, $t_2$, $t_3$, $t_4$) a mass balance is used to measure the mass of the exited gas product D, seen in Table 2 to be given by (17 g, 70 g, 123 g, 140 g). The stoichiometry of the reaction then permits one to find the total mass of the reactants A plus B (85 g, 340 g, 595 g, 680 g) that are responsible for the mass of the exited gas product D (17 g, 70 g, 123 g, 140 g). During each of these times a measurement is made of the temperature to determine its change (1.9 K, 8.0 K, 13.8 K, 16.0 K) from the target temperature T. Equation 34 is then used to evaluate the value of α at each different measuring time (1.00021, 0.99968, 1.00003, 0.99935), whose average value is then found to be approximately equal to one, i.e., α≈1.

TABLE 1

| Solvent Constant Mass (g) | Reactant A Initial Mass (g) | Reactant B Initial Mass (g) | Initial Mass (M) (g) | Target Temp (T) (K) | Desired Lingerature (τ) (sec) |
| --- | --- | --- | --- | --- | --- |
| 13,000 | 1,300 | 910 | 15,210 | 353 | 275.5 |

TABLE 2

| Time Interval $t_i$ | Exiting Gas $ΔD_i$ (g) | Spent A Reactant $ΔA_i$ (g) | Spent B Reactant $ΔB_i$ (g) | Change in Reactant Mass $ΔM_i$ (g) | Temperature $T_i$ (K.) | Thermal Change $|ΔT_i|$ (K.) |
| --- | --- | --- | --- | --- | --- | --- |
| $t_1$ | 17 | 50 | 35 | 85 | 354.9 | 1.9 |
| $t_2$ | 70 | 200 | 140 | 340 | 361.0 | 8.0 |
| $t_3$ | 123 | 350 | 245 | 595 | 366.8 | 13.8 |
| $t_4$ | 140 | 400 | 280 | 680 | 369.0 | 16.0 |

TABLE 3

| Time Interval $t_i$ | Change in Reactant Mass $ΔM_i$ (g) | Thermal Change $|ΔT_i|$ (K) | $α_i = \dfrac{\left(\dfrac{M}{T}\right)}{\left(\dfrac{M - ΔM_i}{T - |ΔT_i|}\right)}$ |
| --- | --- | --- | --- |
| $t_1$ | 85 | 1.9 | 1.00021 |
| $t_2$ | 340 | 8.0 | 0.99968 |
| $t_3$ | 595 | 13.8 | 1.00003 |
| $t_4$ | 680 | 16.0 | 0.99935 |
| Average | | | 0.999818 |

In one embodiment, α is a number between 0.8 and 1.2. In another embodiment, α is a number between 0.9 and 1.1. In another embodiment, α is a number between 0.95 and 1.05.

Establishing β

The β value for a given chemical reaction is related to its linger behavior. A statistical value for β can be readily found. For instance, it can be found for the same hypothetical chemical reaction shown in equation 7.

$$\beta = \frac{\sum_{i=1}^{N} \beta_i}{N} \approx 1 \tag{35}$$

$$\beta_i = \frac{\left(\dfrac{\tau - |Δ\tau_i|}{\tau}\right)}{\left(\dfrac{M - ΔM_i}{M}\right)^2} \tag{36}$$

Experimentally-obtained plots of dynamic viscosity $ϑ(τ)$ versus viscosity-temperature ($T(ϑ)$) are known for a variety of substances. See, for example, FIG. 4, which shows such a plot for water. Dynamic viscosity $ϑ(τ)$ provides a means to determine the calculated lingerature ($τ_i$). In the hypothetical example, the target temperature T is 353 K. Referring to the plot of FIG. 4, a temperature range of 318 K to 388 K was selected that both encompassed the target temperature and may be approximated by a regression equation (e.g. linear regression). In FIG. 4 the equation of the corresponding line is $ϑ(τ)=-0.0028$ mPa $K^{-1}(T(ϑ))+1.35$ mPa in the form y=mx+b, wherein y is the dynamic viscosity $ϑ(τ)$ and x is the viscosity-temperature (T( )). The calculated lingerature ($τ_i$) is found based on the measured temperature ($τ_i$) and the reactant change ($ΔM_i$) according to the lingerature transducer equation:

$$\tau_i = \frac{b + m \times T_i}{\dfrac{G(M - ΔM_i)^2}{rVN_{DoF}}} \tag{37}$$

wherein m is the slope, b is the y-intercept, $T_i$ is a measured temperature during the $i^{th}$ interval, M is the initial mass of the system, $ΔM_i$ is a change in reactant mass during the $i^{th}$ interval found based on the exited mass ($E_i$), G is the gravitational constant ($6.6743×10^{-11}$ m$^3$ kg$^{-1}$s$^{-2}$), $N_{DoF}$ is the number of degrees of freedom of the solvent molecules (e.g. 5 for water), V is the volume of the vessel and r is the radius of spherical volume that corresponds to the volume (V).

For example, a hypothetical vessel is a cylinder with a radius of 13 cm and a height of 28.8 cm thus characterized by a volume (V) of 15,290.75 cm$^3$ or 0.01529 m$^3$ in SI units. The spherical radius (r) for the vessel is derived from the expression $(3V/4π)^{1/3}$ and is 0.15386 m. In the following example, the desired lingerature (τ) is 275.5 sec and the system has the same initial conditions as shown in Table 4. The chemical reaction is permitted to run while its change in reactant mass ($\Delta M_i$) and measured temperature ($T_i$) are measured. This permits one to calculate values for $\beta_i$ as the reaction progresses.

TABLE 4

| Time Interval $t_i$ | Change in Reactant Mass $\Delta M_i$ (g) | Measured Temperature $T_i$ (K) | Calculated Lingerature $\tau_i = \dfrac{b + m \times T_i}{\dfrac{G(M-\Delta M_i)^2}{rVN_{DoF}}}$ (sec) | Change in Lingerature $\Delta \tau_i$ (sec) | $\beta_i = \dfrac{\left(\dfrac{\tau - \lvert \Delta \tau_i \rvert}{\tau}\right)}{\left(\dfrac{M - \Delta M_i}{M}\right)^2}$ |
|---|---|---|---|---|---|
| $t_1$ | 85 | 354.9 | 274.47 | −1.03 | 1.00756 |
| $t_2$ | 340 | 361.0 | 270.35 | −5.15 | 1.02669 |
| $t_3$ | 595 | 366.8 | 266.48 | −9.02 | 1.04762 |
| $t_4$ | 680 | 369.0 | 264.47 | −11.03 | 1.05192 |
| | | | | Average | 1.03345 |

In one embodiment, β is a number between 0.8 and 1.2. In another embodiment, β is a number between 0.9 and 1.1. In another embodiment, β is a number between 0.95 and 1.05.

Establishing Specific Heat Capacity (SHC)

In one embodiment, the SHC of the system is found by conventional thermochemical means (e.g. calorimetry). In another embodiment, a dynamic specific heat capacity ($SHC_i$) of the system is calculated for each $i^{th}$ iteration according to:

$$SHC_i = \frac{k_B}{2m_{SG_y,i}} \tag{38}$$

wherein $k_B$ is the Boltzmann constant and $m_{SG_y,i}$ is the $i^{th}$ iteration subgyrador mass. The $i^{th}$ iteration subgyrador mass is given by $$m_{SG_y,i} = \frac{\Delta M_i}{\Delta N_{Th,i}} \tag{39}$$

wherein $\Delta M_i$ is the change in reactant mass during the $i^{th}$ iteration. The $\Delta N_{Th,i}$ is the $i^{th}$ iteration number of reactant-thermotes given by:

$$\Delta N_{Th,i} = \frac{\kappa \Delta M_i / k_B T}{2\ln\left(\dfrac{M}{\Delta M_i}\right) + 1 - \dfrac{\ln(q) + \dfrac{N_{DoF}}{2} - 2\ln\left(\dfrac{M}{\Delta M_i}\right)}{\ln(N_{Th}) - 1}} \tag{40}$$

wherein $$N_{Th} = \frac{Mc^2}{N_{DoF} k_B T / 2} \tag{41}$$

and $$q = (k_B T)^{\frac{N_{DoF}}{2}} \left(\frac{m}{2\pi}\right)^{\frac{3}{2}} \frac{2I}{\sigma \hbar^5} V \tag{42}$$

h is the reduced Planck constant ($1.05457 \times 10^{-34}$ Js); c is the speed of light ($2.9997 \times 10^8$ m s$^{-1}$); $k_B$ is the Boltzmann constant ($1.381 \times 10^{-23}$ JK$^{-1}$); K is a constant that relates reactant kgs to heat in joules (20.9 MJ per kg in this example); M is the initial system mass, T is the desired temperature; $N_{DoF}$ is the number of degrees of freedom of the solvent molecules (e.g. 5 for water); I is the average moment of inertia of the solvent (e.g. $2 \times 10^{-47}$ m$^2$kg for water); σ is the symmetry value of the solvent (2 for water); m is the mass of a solvent molecule (e.g. $3 \times 10^{-26}$ kg for water); V is the volume of the vessel (e.g. 0.01529 m$^3$). The constant κ is generally about 20.9 MJ per kg but may be, in one embodiment, within ±5% and can be found by optimizing for the yield of the desired product (see Theoretical Background section). In another embodiment, the constant κ is within ±2% of 20.9 MJ per kg.

For example, in a given $i^{th}$ iteration, the $SHC_i$ may be found to be 3.779 Jg$^{-1}$K$^{-1}$ as shown below. In the following example, the change in reactant mass ($\Delta M_i$) is 340 g, the initial system mass (M) is 15.21 kg, then a partition function (q) is given by:

$$q = (k_B T)^{\frac{N_{DoF}}{2}} \left(\frac{m}{2\pi}\right)^{\frac{3}{2}} \frac{2I}{\sigma \hbar^5} V \tag{43}$$

$$q = (1.381 \times 10^{-23} \, J.K^{-1} \times 353 K)^{\frac{5}{2}}$$

$$\left(\frac{3 \times 10^{-26} \text{kg}}{2\pi}\right)^{\frac{3}{2}} \frac{2 \times 2 \times 10^{-47} \text{m}^2\text{kg}}{2 \times (1.05457 \times 10^{-34})^5 J.s)^5} \times 0.01529 \text{ m}^3$$

$$q = 1.2837129 \times 10^{31}$$

Likewise, $N_{Th}$ is found according to:

$$N_{Th} = \frac{Mc^2}{N_{DoF} k_B T / 2} \tag{44}$$

$$N_{Th} = \frac{15.21 \text{ kg} \times (2.9997 \times 10^8 \text{m/s})^2}{5 \times 1.381 \times 10^{-23} J.K^{-1} \times 353 \, K/2}$$

$$N_{Th} = 1.12328 \times 10^{38}$$

In the present example, the $i^{th}$ iteration number of reactant-thermotes ($\Delta N_{Th,i}$) is therefore given by:

$$\Delta N_{Th,i} = \frac{\kappa \Delta M_i / k_B T}{2\ln\left(\frac{M}{\Delta M_i}\right) + 1 - \frac{\ln(q) + \frac{N_{DoF}}{2} - 2\ln\left(\frac{M}{\Delta M_i}\right)}{\ln(N_{Th}) - 1}} \quad (45)$$

$$\Delta N_{Th,i} = \frac{(20.9 \times 10^6 J \cdot kg^{-1} \times 0.340 \ kg/(1.381 \times 10^{-23} J \cdot K^{-1} \times 353K)}{2\ln\left(\frac{15.21 \ kg}{0.340 \ kg}\right) + 1 - }$$

$$\frac{\ln(1.2837129 \times 10^{31}) + \frac{5}{2} - 2\ln\left(\frac{15.21 \ kg}{0.340 \ kg}\right)}{\ln(1.12328 \times 10^{38}) - 1}$$

$$\Delta N_{Th,i} = 1.86095 \times 10^{26}$$

The $i^{th}$ iteration subgyrador mass ($m_{SG_y,i}$) is found according to:

$$m_{SG_y,i} = \frac{\Delta M_i}{\Delta N_{Th,i}} = \frac{0.340 \ kg}{1.86095 \times 10^{26}} = 1.82702 \times 10^{-27} \ kg \quad (46)$$

Finally, the $SHC_i$ for the $i^{th}$ iteration is given by $$SHC_i = \frac{k_B}{2m_{SG_y,i}} = \quad (47)$$

$$\frac{1.381 \times 10^{-23} J \cdot K^{-1}}{2(1.82702 \times 10^{-27} \ kg)} = 3779 \ J \ kg^{-1} K^{-1} = 3.779 \ J \ g^{-1} K^{-1}$$

During subsequent iterations, the $SHC_i$ may be dynamically recalculated based on an updated change in reactant mass ($\Delta M_i$).

Frequency of Lingerature Adjustment

In one embodiment, the stress a chemical reaction experiences is maintained by adjusting the lingerature (i.e. performing method 300 or method 500) frequently enough to maintain a stress value within a predetermined threshold. Examples of suitable stress values include (1) a lingerature value ($\tau_i$), (2) a viscosity value ($\vartheta_i$), and (3) a pressure value ($P_i$). In one embodiment, the lingerature value and the pressure value are maintained within 10% of their normal lingerature value ($\tau_N$) and normal pressure value ($P_N$), respectively. In another one embodiment, the lingerature value and the pressure value are maintained within 5% of their normal lingerature value ($\tau_N$) and normal pressure value ($P_N$), respectively. The viscosity deviation is within 1% of the sum of the lingerature deviation and the pressure deviation. For example, if the lingerature deviation is 5% and the pressure deviation is 5%, then the viscosity deviation is between 9-11%. As a further example, if the lingerature deviation is 10% and the pressure deviation is 10%, then the viscosity deviation is between 19-21%. As a further example, if the lingerature deviation is 3% and the pressure deviation is 3%, then the viscosity deviation is between 5-7%. In another embodiment the lingerature and pressure value are maintained within 10% of their normal values which then results in a viscosity value within 1% of 20% of its normal value where the 20% of the viscosity deviation results from the sum of the 10% for the lingerature deviation and the 10% for the pressure deviation.

These normal values are calculated based on the desired temperature (T) which was obtained by maximizing the yield of a desired product. In the running example, the desired temperature (T) is 353 K, the initial system mass (M) is 15.21 kg, the reaction occurs in a vessel that is a cylinder with a radius of 13 cm and a height of 28.8 cm thus characterized by a volume (V) of 15,290.75 cm³ or 0.01529 m³ in SI units. The spherical radius (r) for the vessel is derived from the expression $(3V/4\pi)^{1/3}$ and is 0.15386 m. The solvent is water ($N_{DoF}$=5) and the dynamic viscosity $\vartheta(\tau)$ versus viscosity-temperature ($T(\vartheta)$) plot of FIG. 4 applies (m=−0.0028 mPa·s·K⁻¹, b=1.35 mPa·s)).

The normal lingerature value ($\tau_N$) is found according to:

$$\tau_N = \frac{b + m \times T}{\frac{G(M)^2}{rVN_{DoF}}} \quad (48)$$

In the running example, the normal lingerature value ($\tau_N$) is 275.5 seconds.

The normal viscosity value ($\vartheta_N$) is found according to:

$$\vartheta_N = b + (mT) \quad (49)$$

In the running example, the normal viscosity value ($\vartheta_N$) is 0.3616 mPa·s.

The normal pressure value ($P_N$) is found according to:

$$P_N = \frac{b + mT}{\tau_N} \quad (50)$$

In the running example, the normal pressure value ($P_N$) is 0.001313 mPa.

During the course of the reaction the exited mass ($E_i$) leaves the vessel which produces the change in reactant mass ($\Delta M_i$) and a temperature change ($\Delta T_i$). These values, in turn, produce the change in lingerature ($\Delta \tau_i$), a change in viscosity ($\Delta \vartheta_i$) and a change in pressure ($\Delta P_i$).

The lingerature value ($\tau_i$) is found according to:

$$\tau_i = \left(\frac{M - \Delta M_i}{M}\right)^2 \tau_N, \text{exothermic} \quad (51)$$

$$\tau_i = 2\tau - \left(\frac{M - \Delta M_i}{M}\right)^2 \tau, \text{endothermic} \quad (52)$$

For example, when the change in reactant mass ($\Delta M_i$) is 0.3628 kg for an exothermic reaction and the normal lingerature value ($\tau_N$) is 275.5 seconds then $\tau_i$ is 262.5 seconds. This shows a 4.7% change in lingerature which is within a 5% threshold.

Conversely, if the user waited until the change in reactant mass ($\Delta M_i$) is 0.4000 kg and the normal lingerature value ($\tau_N$) is 275.5 seconds then $\tau_i$ is 261.2 seconds. This shows a 5.2% change in lingerature which is outside of the 5% threshold. In those embodiments that use 5% as the predetermined threshold, the user should adjust the lingerature more frequently.

Similarly, the viscosity value ($\vartheta_i$) is found according to:

$$\vartheta_i = b + (mT_S) \quad (53)$$

wherein $T_S$ is a sampling temperature found according to:

$$T_s = \frac{-b + \frac{G(M - \Delta M_i)^2}{rVN_{DoF}} \tau_i}{m} \quad (54)$$

For example, when the change in reactant mass ($\Delta M_i$) is 0.3628 kg and the normal lingerature value ($T_N$) is 275.5 seconds then $\tau_i$ is 262.5 seconds. From this, the sampling temperature ($T_S$) is found to be 364.9 K and the viscosity value ($\vartheta_i$) is therefore 0.3283 mPa·s. This shows a 9.2% change in viscosity which is within a 10% threshold.

Conversely, if the user waited until the change in reactant mass ($\Delta M_i$) is 0.4000 kg ($T_N$=275.5 sec, $\tau_i$=261.2 sec, $T_S$=364.9 K) the viscosity value ($\vartheta_i$) is 0.3250 mPa·s. This shows a 10.1% change in viscosity which is outside of a 10% threshold. In those embodiments that use 10% as the predetermined threshold, the user should adjust the lingerature more frequently.

The pressure value ($P_i$) is found according to:

$$P_i = \frac{b + mT_S}{\tau_i} \tag{55}$$

For example, when the change in reactant mass ($\Delta M_i$) is 0.3628 kg ($\tau_N$=275.5 sec, $\tau_i$=261.2 sec, $T_S$=364.9 K) the pressure value ($P_i$) is 0.001251 mPa. This shows a 4.7% change in pressure which is within a 5% threshold.

Conversely, if the user waited until the change in reactant mass ($\Delta M_i$) is 0.4000 kg ($\tau_N$=275.5 sec, $\tau_i$=261.2 sec, $T_S$=364.9 K) the pressure value ($P_i$) is 0.001244 mPa. This shows a 5.2% change in pressure which is outside of a 5% threshold. In those embodiments that use 5% as the predetermined threshold, the user should adjust the lingerature more frequently.

Theoretical Background

Introduction

The lingerature of any given chemical reaction can be defined as the predicted future time-duration of constancy of the viscosity and pressure that act on the particles of the medium. In this disclosure the control of the lingerature of either exothermic or endothermic reactions under non-equilibrium conditions is addressed by looking at chemical reactions through the lens of an ascending Quantum Gravity Linger Thermo Theory (QG-LTT) in physics. In this innovative framework, lingerature control methods are derived using the medium's quantum gravitational spacetime where gravity and the gyrations of mass quantums fueled by thermal quantums, rules the mediums viscosity and pressure. In this quantum spacetime the motion of mass quantums, named gyradors, which control the gravitational collapse of the medium, are constrained by the medium's linger-viscosity, while the retention of energy quantums named thermotes which fuel the gyradors' kinetic energy, are constrained by the medium's thermal-energy. In QG-LTT, the particles where the constant pressure act are dissimilar cells (DCS) made of arbitrary-size groups of atoms and/or molecules that are created, exist, die, or exit the medium. These dissimilar cells are special since, through their collective action, they unveil a QG Spacetime-Enclosing for optimum energy efficient quantum gravity interactions. The first DCS findings were star particles and organism cells first reported at an AAS Meeting in 2019. The DCS driven QG-LTT of this application has led to maximally efficient and affordable iteration methods for the dynamic control of the lingerature of chemical reactions. The roots of the QG-LTT formulation reside in a past-uncertainty/future-certainty time-complementary duality principle of physics, named POP, that first popped up in controls. In the late 1970s the POP was discovered to have naturally surfaced in the 1960 stochastic control work of Rudolph E. Kalman who optimally controlled 'past-uncertainty unquantized states' with 'future-certainty unquantized controls. This revelation was then used in a CUNY Graduate Center PhD in 1981 to advance a maximally efficient and affordable future-certainty Matched Processors (MPs) alternative to Bellman's Dynamic Programming for quantized control (see, Int' Journal of Control, Vol. 42, pp. 695-713, 1985) with applications in neural networks. The POP guided unification of the future-certainty MPs with the past-uncertainty Matched Filters (MFs) for bit detection of digital communications would then lead to the efficient control of 'past-uncertainty quantized states' with 'future-certainty quantized controls'. Another POP guided theory was Latency Information Theory, formulated in the mid-2000s for the efficient solution of complex detection problems such as those encountered in radar (see U.S. Pat. No. 10,101,445). In general terms the POP directs the use and/or formulation of new future-certainty methods to make predictions about future physical states, for instance, when the deterministic Laws of Motion in Physics are used to make predictions about the future position and velocity of a particle. For the present and past states, the POP instructs the use and/or formulation of new past-uncertainty methods to handle present and past uncertainty states, for instance, when the laws of thermodynamics are used to determine the amount of thermalenergy that is necessary to fuel the motion of an object whose initial position and speed is known to always be uncertain as the Heisenberg Uncertainty Principle instructs. The first principles of QG-LTT will be reviewed here and then used in the derivation of the lingerature control methods of this disclosure. In an opening section the exothermic control methods will be proven first and then in another section the endothermic control ones. In a final section the dynamic specific heat capacity of controlled chemical reactions will be derived.

The Exothermic Lingerature Control Methods

The Exothermic Dynamic Lingerature Control Equation (DLCE) and its Derivation.

Introductory words: The exothermic DLCE is a dynamic $i^{th}$ iteration equation that allows the calculation of the change in lingerature ($\Delta \tau_i$) that an exothermic chemical reaction has decreased by the end of the $i^{th}$ iteration of processing. This $\Delta \tau_i$ knowledge is then used in its correction.

The DLCE is derived under several physical constraints. First, the medium is noted to satisfy the following gyradors' viscosity equation of state (VEOS):

$$\vartheta = P_{Gy}\tau. \tag{56}$$

which equates the initial amount of the medium's dynamic viscosity ($\vartheta$) to the product of its desired lingerature ($\tau$) and a constant gyrador pressure ($P_{Gy}$) that acts on the medium's DCS. In turn, the constant gyrador pressure ($P_{Gy}$) can be derived from the following gyradors' energy equation of state (EEOS):

$$P_{Gy}V = k_B T N_{Gy} = k_B TM/m_{GY} = GM^2/rN_{DoF} \tag{57}$$

$$N_{Gy} = M/m_{Gy} = N_{Cell} = GM^2/rN_{DoF}k_B T \tag{58}$$

$$m_{Gy} = \frac{\sum_{i=1}^{L} n_i m_i}{\sum_{i=1}^{L} n_i} = \frac{M}{N_{Cell}} = \frac{e_{Th}}{v_{Gy}^2/2} = \frac{N_{DoF}k_B T}{GM} \cdot \frac{r}{N_{Gy}} = \frac{M}{N_{Gy}} \tag{59}$$

where: 1) V is the medium's volume; 2) $k_B$ is the Boltzmann constant; 3) T is the medium's temperature; 4) M is the medium's mass; 5) r is the radius of the assumed spherical medium's volume; 6) L is the number of the different mass amounts found in the DCS (e.g. it is two if only hydrogen and helium atoms are found in the DCS); 7) $n_i$ is the number of DCS with an $m_i$ mass; 8) $N_{Cell}=\tau_{i=1}^L n_i$ is the total number of DCS; 9) $M=\Sigma_{i=1}^L n_i m_i$ is the total mass of the medium; 10) $m_{Gy}=\Sigma_{i=1}^L n_i m_i / \Sigma_{i=1}^L n_i$ is the mass of each gyrador which is the same as the average-mass of the medium's DCS; 11) $N_{DoF}$ is the medium's number of degrees of freedom (DoF), for example, it is 2 for a black-hole, it is 3 for a photon-gas, and it is 5 for a flexible-phase medium made of water molecules; 12) $N_{Gy}=M/m_{Gy}$ is the number of gyradors in the medium which is the same as the number of DCS ($N_{Cell}$); 13) $e_{Gy}=M/m_{Gy}v_{Gy}^2/2$ is the kinetic-energy of the gyrador where $v_{Gy}=(GM/r)^{1/2}$ is its constant orbiting-speed; 14) $e_{Th}=N_{DoF}k_BT/2$ is the thermal-energy of the thermote; and 15) $m_{Gy}=N_{DoF}k_BTr/GM$ is an equation for finding the mass of each gyrador, this result surfaces when the gyrador's kinetic-energy ($e_{Gy}=m_{Gy}v_{Gy}^2/2$), with $v_{Gy}=(GM/r)^{1/2}$ replacing $v_{Gy}$, is set equal to the thermote's thermal-energy ($e_{Th}=N_{DoF}k_BT/2$).

Equations 56 and 57 would then give rise to the $i^{th}$ iteration viscosity change ($\Delta\vartheta_i$) given by:

$$\Delta\vartheta_i = P_{Gy} = \Delta\tau_i = (GM^2/rVN_{DoF})\Delta\tau_i \quad (60)$$

$$P_{Gy} = GM^2/rVN_{DoF} \quad (61)$$

where: a) $\tau\tau_i$ is the change in lingerature that has occurred by the end of the $i^{th}$ iteration; and b) $P_{Gy}$ is the constant gyrador pressure that acts on the DCS and whose value is carefully regulated by having the change in reactant mass ($\Delta M_1$) restored back to the chemical reaction soon after it is measured. For an exothermic chemical reaction, a positive temperature change ($\Delta\tau_i$) would have occurred at the end of the $i^{th}$ iteration. However, since for most chemical-reactions the viscosity of the medium decreases as its temperature increases, it would then follow from equation 60 that the change in lingerature ($\Delta\tau_i$) is expected to be negative, thus indicating that the lingerature of the exothermic chemical reaction has decreased.

The stated relationship that exists between viscosity and temperature is illustrated in FIG. 4 for the case of liquid water where its dynamic-viscosity, given in SI [mPa]s units, is displayed versus temperature in SI K units where the dynamic-viscosity is noted to decrease as the temperature increases. A similar experimentally found figure may be found for the actual chemical reaction under consideration. It would then become possible to find a suitable analytical expression that relates viscosity to temperature, which then simplifies the control of the chemical reaction's lingerature. For this solvent type the following analytic expression is derived for the evaluation of the medium's temperature (T) for the range of temperatures between 350 K and 400 K:

$$T = \frac{1.35 \ mPa\cdot s - \vartheta}{0.0028 \ mPa\cdot s\cdot K^{-1}} = \quad (62)$$

$$\frac{1.35 \ mPa\cdot s - P_{Gr}\tau}{0.0028 \ mPa\cdot s\cdot K^{-1}} = \frac{1.35 \ mPa\cdot s - (GM^2/rVN_{DoF})\tau}{0.0028 \ mPa\cdot s\cdot K^{-1}}, \text{ liquid water}$$

Statement of the exothermic DLCE: The statement is:

$$\tau_i = \beta\left(\frac{M_i}{M}\right)^2 \tau = \beta\left(\frac{M-\Delta M_i}{M}\right)^2 \tau = \tau + \Delta\tau_i = \tau - |\Delta\tau_i|, \text{ exothermic} \quad (63)$$

$$\beta = \frac{\left(\frac{\tau_i}{\tau}\right)}{\left(\frac{M_i}{M}\right)^2} = \frac{\left(\frac{\tau - |\Delta\tau_i|}{\tau}\right)}{\left(\frac{M - \Delta M_i}{M}\right)^2} \approx 1 \quad (64)$$

$$M_i = M - \Delta M_i < M \quad (65)$$

$$\tau_i = \tau + \Delta\tau_i = \tau - |\Delta\tau_i| < \tau \quad (66)$$

where: a) $\Delta M_i$ is the change in reactant mass during the $i^{th}$ iteration; b) $M_i$ is the current system mass remaining at the end of the $i^{th}$ iteration; c) $\Delta T_i$ is the change in lingerature by the end of the $i^{th}$ iteration; d) $\tau_i$ is the dynamic lingerature remaining at the end of the $i^{th}$ iteration; and e) the value of the $\beta$ parameter is close to one.

Derivation of the exothermic DLCE: The derivation is achieved in five steps.

Step 1. In this first step two fundamental quantums of QG-LTT are noted, one of mass and the other of energy. The quantum of mass is the gyrador with symbol $m_{Gy}$, which is the DCS's average-mass and where $M/m_{Gy}$ gyradors make up the initial system mass (M). The gyrador mass ($m_{Gy}$), visualized as a point-mass of zero-volume, would orbit the point-mass of the initial system mass (|M|) at the radial distance (r). This radial distance, in turn, would be linked to the mediums volume (V), say, for instance, that for a cylindrical reaction vessel, which is fitted into a minimum surface-area ($A=4\pi r^2$) spherical medium which in principle provides a minimum energy loss to its surroundings. The orbiting speed of the gyrador ($v_{Gy}=(GM/r)^{1/2}$) would be a constant value which surfaces when the kinetic-energy of the medium's $M/m_{Gy}$ gyradors, given by $(M/m_{Gy})\times m_{Gy}v_{Gy}^2/2$, is first set equal to the medium's gravitational potential energy ($GM^2/2r$), and then this equality equation is solved for $v_{Gy}$. Moreover, with this result implying that the gyradors that orbit the point-mass of the initial system mass (|M|) at the radial distance (r) would extract from the surface-area ($A=4\pi r^2$) of the medium's sphere the thermal-energy required to fuel the kinetic-energy needed to overcome the medium's dynamic viscosity ($\vartheta$). This thermal-energy would be provided to the gyradors through quantums of thermal-energy ($e_{Th}$), named thermotes, where each gyrador would have its kinetic-energy ($e_{Gy}=m_{Gy}v_{Gy}^2/2$) fueled by a single thermote of energy given by ($e_{Th}=N_{DoF}k_BT/2$) with $N_{DoF}$ denoting the degrees of freedom of the medium, $k_B$ is the Boltzmann constant, and T is the temperature driving the gyradors motion. Like the gyradors have a constant gyrador orbiting-speed ($v_{Gy}=(GM/r)^{1/2}$) that provides a future-certainty motion measure for their motions, the thermotes have a constant thermote surface-pace ($\Pi_{Th}=\tau/A$) that provides a past-uncertainty retention measure for their retentions. The $\tau$ in $\Pi_{Th}=\tau/A$ is thus the amount of time (or lingerature) that a thermote in A would be available in the future to fuel the kinetic-energy of a gyrador. These $\Pi_{Th}$-retention and $v_{Gy}$-motion measures for thermotes and gyradors, respectively, conveys a POP measure duality of QG-LTT.

Step 2. In this second step the thermotes surface-pace ($\Pi_{Th}$) is expressed as follows:

$$\Pi_{Th}=\tau/A=\tau 4\pi r^2=(v_{Gy}^4/4\pi G^2)\tau/M^2= (e_{Th}^2/\pi G^2 m_{Gy}^2)\tau/M^2 \quad (67)$$

$$v_{Gy}=(GM/r)^{1/2} \quad (68)$$

$$e_{Gy}=m_{Gy}v_{Gy}^2/2=e_{Th} \tag{69}$$

$$e_{Th}=N_{DoF}k_BT/2 \tag{70}$$

$$m_{Gy}=N_{DoF}k_BTr/GM \tag{71}$$

$$e_{G,M}=GM^2/2r \tag{72}$$

$$N_{Gy}\times e_{Gy}=M/m_{Gy}\times m_{Gy}v_{Gy}^2/2=e_{G,M}=GM^2/2r \tag{73}$$

where:

$\Pi_{Th}=\tau/A$ is the thermotes surface-pace of the medium given by the ratio of the desired lingerature ($\tau$) over the minimum surface-area (A) of the medium where gyradors are fueled by thermotes and their synergistic behavior avert the medium's gravitational collapse;

$\Pi_{Th}=\tau/4\pi r^2$ is the thermotes surface-pace expressed in term of the initial lingerature ($\tau$) and the radial distance ($\tau$), derived making use of the surface-area expression $A=4\pi r^2$;

$\Pi_{Th}=(v_{Gy}^4/4\pi G^2)\tau/M^2$ is the thermotes surface-pace expressed in terms of the medium's initial system mass (M) and the gyradors speed ($v_{Gy}$), derived making use of the radial expression $r=GM/v_{Gy}^2$;

$\Pi_{Th}=(e_{Th}^2/\pi G^2 m_{Gy}^2)\tau/M^2$ is the thermotes surface-pace expressed in terms of the medium's initial system mass (M), the thermal-energy of the thermote ($e_{Th}$), and the gyradors mass ($m_{Gy}$), which was derived making use of the gyrador's kinetic-energy $e_{Gy}=m_{Gy}v_{Gy}^2/2=e_{Th}$, which is also set equal to the thermotes thermal-energy ($e_{Th}$) to express $v_{Gy}$ as a function of $e_{Th}$ and $m_{Gy}$;

$e_{Th}=N_{DoF}k_BT/2$ is the thermote energy equation (TEE) that was first offered in 2014 for use in the finding of the entropy of a flexible-phase medium with applications in lifespan investigations. Two years later in 2016 it was also shown that known entropies for black-holes that produce the longest possible retention of matter, and photon-gases that facilitate the fastest possible motion of matter, could also be expressed in terms of thermotes. This result significantly simplified the derivation of their entropy. Using this enabling theoretical as well as practical discovery, it was further revealed that the thermote values found for both black-hole and photon-gas mediums at the cosmic microwave background (CMB) temperature of 2.725 K had 235.14 and 352.71 μeV masses, respectively, in the 50 to 1,500 μeV-mass range of the axion. The axion is a theoretical particle, first surfacing in the formulation of the Standard Model of Particle Physics, that is a top dark matter candidate where a promising gravitation-based wind-chimes method for its detection has been offered;

$m_{Gy}=N_{DoF}k_BTr/GM$ is the gyrador mass equation (GME), discussed earlier when equation 59 was explained, allowing the straightforward finding of the gyrador mass ($m_{Gy}$) from knowledge of the medium's desired temperature (T), the initial system mass (M), radius (r), and number of degrees of freedom ($N_{DoF}$);

$v_{Gy}=(GM/r)^{1/2}$ is the orbiting-speed of the gyrador that surfaces when the kinetic-energy of the medium's $M/m_{Gy}$ gyradors given by $(M/m_{Gy})\times m_{Gy}v_{Gy}^2/2$ is first set equal to the medium's gravitational potential energy ($e_{G,M}=GM^2/2r$) to prevent the gravitational collapse of the medium, and then the resultant equation solved for $v_{Gy}$.

Thermote quantums and gyrador quantums form together a POP quantum duality of QG-LTT that conveys a past-uncertainty thermal-energy quantum, the thermote, and a future-certainty linger-viscosity quantum, the gyrador.

The thermote's surface-pace measure and the gyrador's orbiting-speed measure form together a POP measure duality of QG-LTT that conveys a past-uncertainty thermote measure, the thermotes surface-pace, and a future-certainty gyrador measure, the gyradors orbiting-speed.

Step 3. In this third step the $i^{th}$ iteration thermotes surface-pace ($\Pi_{Th,i}$) of the chemical reaction is noted through equation 67 to be given by the following expressions:

$$\Pi_{Th,i}=\tau_i/A_i=(v_{Gy,i}^4/4\pi G^2)\tau_i/M_i^2 \tag{74}$$

$$v_{Gy,i}=(GM_i/r_i)^{1/2}\approx v_{Gy}=(GM/r)^{1/2} \tag{75}$$

$$M_i/r_i\approx M/r \tag{76}$$

where the medium's $i^{th}$ iteration current system mass ($M_i$), radius ($r_i$), and surface-area ($A_i$) values are smaller than their initial ones. Moreover, with the further assumption that the approximate mass-radius ratio equation 76 will generally apply to exothermic chemical reactions.

Step 4. In this fourth step the ratio of the $i^{th}$ iteration thermotes surface-pace ($\Pi_{Th,i}$) of equation 74 over the initial thermotes surface-pace $\Pi_{Th}$ of equation 67 is taken to arrive at the following relationship:

$$\tau_i/M_i^2 = \frac{v_{Gy}^4}{v_{Gy,i}^4}\tau/M^2 = \left(\frac{M/r}{M_i/r_i}\right)^2 \tau/M^2 = \beta\tau/M^2 \tag{77}$$

$$\beta = \left(\frac{M/r}{M_i/r_i}\right)^2 \tag{78}$$

where the β parameter of equation 77 is close to one in value as is seen when use is made of equation 76 in equation 78.

Step 5. In this last step equation 77 is solved for the $i^{th}$ iteration lingerature ($\tau_i$) to arrive at the sought-after equation 63.

The Exothermic Linger-Viscosity Based DLCE and its Derivation.

Introductory words: The exothermic linger-viscosity based DLCE is an $i^{th}$ iteration equation that states the amount of surface-area ($|A_i|$) that must be added to the medium to compensate for the medium's surface-area decrease due to the increase of the mechanical work-energy ($\delta W_{Mec,i}$)'s pressure on the thermotes of an exothermic reaction. In turn, the addition of surface-area by $|\Delta A_i|$ would lead to an increase of the medium's lingerature by $|\Delta \tau_i|$, an increase of the medium's dynamic viscosity by $|\Delta \vartheta_i|$, and a decrease of the medium's temperature by $|\Delta T_i|$. Thus, restoring the values of the surface-area, lingerature, viscosity, and temperature of the medium.

Statement of the exothermic linger-viscosity based DLCE: The statement is:

$$\Delta A_i = \left(\beta\left(\frac{M_i}{M}\right)^2 - 1\right)A, \text{ exothermic} \tag{79}$$

where β is the DLCE parameter of equation 64 whose value is approximately one and $M_i$ is the $i^{th}$ iteration current system mass that is smaller than the medium's initial system mass (M) as per equation 65.

Derivation of the exothermic linger-viscosity based DLCE: The proof is in three steps:

Step 1. In this first step the initial thermotes surface-pace ($\Pi_{Th}$) given by equation 67 and the $i^{th}$ iteration thermotes surface-pace ($\Pi_{Th,i}$) given by equation 74 are noted to yield the same values under the assumption that the initial to $i^{th}$, iteration mass over radius approximation of equation 76 holds. When equations 67 and 74 are equated under condition 76 the following ratio of lingerature to surface-area equation will result:

$$\tau/A = \tau_i/A_i = (\tau + \Delta\tau_i)/(A + \Delta A_i) \tag{80}$$

where both $\Delta\tau_i$ and $\Delta A_i$ are negative quantities that give rise to lower $i^{th}$ iteration lingerature and $i^{th}$ iteration surface-area values according to $\tau_i = \tau + \Delta\tau_i$ and $A_i = A + \Delta A_i$, respectively.

Step 2. Solving equation 80 for $\Delta A_i$ one then arrives at the following expression:

$$\Delta A_i = (\Delta\tau_i/\tau)A = -(|\Delta\tau_i|/\tau)A \tag{81}$$

Step 3. In this final step, equation 63 is first solved for $|\Delta\tau_i|$ and then used in equation 81 to yield the exothermic linger-viscosity based DLCE of equation 79.

The Exothermic Thermal-Energy Based DLCE and its Derivation.

Introductory words: The exothermic thermal-energy based DLCE is an $i^{th}$ iteration equation that states the amount of heat that must be removed from the medium ($|\Delta Q_i|$), to compensate for the medium's heat increase due to the increase of the mechanical work-energy ($\delta W_{Mec,i}$)'s pressure on the thermotes of an exothermic reaction. In turn, the removal of heat by $|\Delta Q_i|$ would lead to an increase of the medium's lingerature by $|\Delta\tau_i|$, an increase of the medium's dynamic viscosity by $|\Delta\vartheta_i|$, and a decrease of the medium's temperature by $|\Delta T_i|$. Thus, bringing the heat, lingerature, viscosity, and temperature of the medium back to their original values.

Statement of the exothermic thermal-energy based DLCE: The statement is:

$$\Delta Q_1 = SHC_i \times M \times \left(1 - \alpha\sqrt{\frac{(1 + \Delta\tau_i/\tau)}{\beta}}\right)T = \tag{82}$$

$$SHC_i \times M \times \left(1 - \alpha\sqrt{\frac{(1 + |\Delta\tau_i|/\tau)}{\beta}}\right)T, \text{ exothermic}$$

$$T_i = T + \Delta T_i = T + |\Delta T_i| = 2T - \alpha\frac{M_i}{M}T, \text{ exothermic} \tag{83}$$

$$T_{i,endo} = T - |\Delta T_i| = \alpha\frac{M_i}{M}T, \text{ endothermic} \tag{84}$$

$$\alpha = \frac{\left(\frac{T_{i,endo}}{T}\right)}{\left(\frac{M_i}{M}\right)} = \frac{\left(\frac{T - |\Delta T_i|}{T}\right)}{\left(\frac{M - \Delta M_i}{M}\right)} \approx 1, \text{ endothermic} \tag{85}$$

where:
SHC$_i$ is the medium's $i^{th}$ iteration specific heat capacity after the change in reactant mass ($\Delta M_i$).
M is the medium's initial system mass.
T is the medium's desired temperature.
$T_i$ is the exothermic medium's $i^{th}$ iteration temperature which is greater than T and results in the temperature increase $T_i - T = \Delta T_i$.
$T_{i,endo}$ is the endothermic medium's $i^{th}$ iteration temperature which is smaller than T and results in the temperature decrease $$T_{i,endo} - T = \alpha\frac{M_i}{M}T - T = -|\Delta T_i|.$$

$\alpha$ is the endothermic parameter given by equation 85 whose value is close to one.
$\beta$ is the exothermic parameter given by equation 64 whose value is close to one.
$\Delta\tau_i$ is the 'negative' lingerature change of the exothermic chemical reaction that is caused by the consumed reactant-mass ($\Delta M_i$).

Derivation of the exothermic thermal-energy based DLCE: The derivation is in four steps:

Step 1. Firstly, it is noted that equations 83, 84 and 85 denote an exothermic $i^{th}$ iteration dynamic temperature control equation (DTCE).

Step 2. The exothermic medium is noted to exhibit an increase in its heat ($\Delta Q_i$) that is due to the mechanical work-energy ($\delta W_{Mec,i}$)'s pressure on the thermotes of an exothermic reaction:

$$\Delta Q_i = SHC_i \times M \times \Delta T_i \tag{86}$$

Step 3. Equation 83 is solved for $\Delta T_i$ and its result substituted in equation 86 to yield:

$$\Delta Q_i = SHC_i \times M \times \left(1 - \alpha\frac{M_i}{M}\right)T \tag{87}$$

Step 4. Finally solving equation 63 for $M_i/M$ and substituting the result in equation 87 one arrives at the exothermic thermal-energy based DLCE of equation 82.

The Endothermic Lingerature Control Methods

The Endothermic Dynamic Lingerature Control Equation (DLCE) and its Derivation.

Introductory words: The endothermic DLCE is a dynamic $i^{th}$ iteration equation that allows the calculation of the amount of lingerature ($\Delta\tau_i$) that an endothermic chemical reaction has increased by the end of the $i^{th}$ iteration of processing, with this $\Delta\tau_i$ knowledge then used in its correction. In an endothermic chemical reaction, the medium's temperature decreases, which then results in the increase of both the mediums viscosity and lingerature.

Statement of the endothermic DLCE: The statement is:

$$\tau_i = 2\tau - \beta\left(\frac{M_i}{M}\right)^2\tau = 2\tau - \beta\left(\frac{M - \Delta M_i}{M}\right)^2\tau = \tau + \Delta\tau_i = \tau + |\Delta\tau_i|, \tag{88}$$

endothermic $$M_i = M - \Delta M_i < M \tag{89}$$

$$\tau_i = \tau + \Delta\tau_i = \tau + |\Delta\tau_i| > \tau, \text{endothermic} \tag{90}$$

where: a) $\Delta M_i$ is the change in reactant mass during the $i^{th}$ iteration; b) $M_i$ is the mediums current system mass at the end of the $i^{th}$ iteration which is less than the initial system mass (M); c) $\Delta\tau_i$ is the change in lingerature at the end of the $i^{th}$ iteration; d) $\tau_i$ is the dynamic lingerature of the medium at the end of the $i^{th}$ iteration; and e) the $\beta$ parameter's value is close to one.

Derivation of the endothermic DLCE: The derivation is in three steps:

Step 1. The endothermic DLCE of equation 88 is derived under the assumption that the change in reactant mass ($\Delta M_i$) would yield similar amounts of change in lingerature $|\Delta\tau_i|$ for both exothermic and endothermic chemical reactions.

Step 2. Making use of equation 63 the lingerature change $|\Delta T_i|$ for the exothermic chemical reaction is noted to be given by:

$$|\Delta \tau_i| = \left|\beta\left(\frac{M_i}{M}\right)^2 \tau - \tau\right| = \tau - \beta\left(\frac{M_i}{M}\right)^2 \tau \quad (91)$$

Step 3. Finally, the lingerature change given by equation 91 is added to the initial lingerature ($\tau$) of the endothermic chemical reaction to yield the endothermic DLCE of equation 88.

The Endothermic Linger-Viscosity Based DLCE and its Derivation.

Introductory words: The endothermic linger-viscosity based DLCE is an $i^{th}$ iteration equation that states the amount of surface-area that must be removed from the medium ($|\Delta A_i|$), to compensate for the medium's surface-area increase due to the decrease of the mechanical work-energy ($\delta W_{Mec,i}$)'s pressure on the thermotes of an endothermic reaction. In turn, the removal of surface-area by $|\Delta A_i|$ would lead to a decrease of the medium's change in lingerature by $|\Delta \tau_i|$, a decrease of the medium's dynamic viscosity by $|\Delta \vartheta_i|$, and an increase of the medium's temperature by $|\Delta T_i|$. Thus, restoring the values of the surface-area, lingerature, viscosity, and temperature of the medium.

Statement of the endothermic linger-viscosity based DLCE: The statement is:

$$\Delta A_i = \left(1 - \beta\left(\frac{M_i}{M}\right)^2\right) A, \text{ endothermic} \quad (92)$$

where $\beta$ is the exothermic DLCE parameter of equation 64 whose value is approximately one and $M_i$ is derived from equation 89 where M is the medium's mass.

Derivation of the endothermic linger-viscosity based DLCE: The derivation of the endothermic linger-viscosity based DLCE is straightforward. More specifically, the endothermic linger-viscosity based DLCE of equation 92 is found under the assumption that the consumed reactant-mass ($\Delta M_i$) would yield a similar amounts of surface-area change $|\Delta A_i|$ for both the exothermic and the endothermic chemical reactions. As a result, equation 92 for the endothermic case would exactly match equation 79 for the exothermic case, except for its sign.

The Endothermic Thermal-Energy Based DLCE and its Derivation.

Introductory words: The endothermic thermal-energy based DLCE is an $i^{th}$ iteration equation that states the amount of heat that must be added to the medium ($|\Delta Q_i|$), to compensate for the medium's heat decrease due to the decrease of the mechanical work-energy ($\delta W_{Mec,i}$)'s pressure on the thermotes of an endothermic reaction. In turn, the addition of heat by $|\Delta Q_i|$ would lead to a decrease of the medium's lingerature by $|\Delta \tau_i|$, a decrease of the medium's viscosity by $|\Delta \vartheta_i|$, and an increase of the medium's temperature by $|\Delta T_i|$. Thus, bringing the heat, lingerature, viscosity, and temperature of the medium back to their original values.

Statement of the endothermic thermal-energy based DLCE: The statement is:

$$\Delta Q_i = SHC_i \times M \times \left(\alpha\sqrt{\frac{(1-\Delta \tau_i/\tau)}{\beta}} - 1\right)T = \quad (93)$$

-continued
$$SHC_i \times M \times \left(\alpha\sqrt{\frac{(1-|\Delta \tau_i|/\tau)}{\beta}} - 1\right)T, endo$$

where: a) $\beta$ is the exothermic DLCE parameter of equation 64 whose value is approximately one; b) $\alpha$ is the endothermic DTCE parameter of equation 85 whose value is approximately one; and c) $\Delta T_j = \tau_i - \tau$ is the 'positive' $i^{th}$ iteration lingerature change of the endothermic chemical reaction that is caused by the change in reactant mass ($\Delta M_i$).

Derivation of the endothermic thermal-energy based DLCE: The derivation of the endothermic thermal-energy based DLCE is straightforward. More specifically, the endothermic thermal-energy based DLCE of equation 93 is found under the assumption that the consumed reactant-mass ($\Delta M_i$) would yield a similar amounts of heat change $|\Delta Q_i|$ for both the exothermic and the endothermic chemical reactions. As a result, equation 93 for the endothermic case would exactly match equation 82 for the exothermic case, except for its sign which will be opposite.

Dynamic Specific Heat Capacity of Controlled Chemical Reactions

Introductory words: Through QG-LTT an analytical expression for the calculation of the dynamic $i^{th}$ iteration QG specific heat capacity ($SHC_i$) of flexible-phase controlled chemical reactions can be found. This expression is linearly related to the ratio of the $i^{th}$ iteration number of reactant-thermotes ($\Delta N_{Th,i}$) over the $i^{th}$ iteration change in reactant mass ($\Delta M_i$) that generates $\Delta N_{Th,i}$. The $\Delta N_{Th,i}$ amount is a large number, for instance, it is in the order of $10^{26}$ for the illustrative chemical reaction of the specifications. The relationship between $SHC_i$, $\Delta M_i$, and $\Delta N_{Th,i}$ would be further mediated by the Boltzmann constant ($k_B$) over 2 which then yields $SHC_i = k_B \Delta N_{Th,i}/2\Delta M_i$. The ratio of $\Delta M_i$ over $\Delta N_{Th,i}$ would in turn define a new quantum of mass ($m_{SGy,i}$), named subgyrador, that makes up the change in reactant mass ($\Delta M_i$). This subgyrador mass quantum ($m_{SGy,i}$) is significantly smaller than the gyrador mass quantum ($m_{Gy}$). For instance, for the illustrative chemical reaction the subgyrador mass is in the order of the hydrogen atom, i.e., $10^{-27}$ kg, while for the gyrador mass it is in the order of $10^{-12}$ kg. From the smallness of the subgyrador masses, it is then reasonable to expect that the subgyradors would be formed from dissimilar subcells of the DCS where the average mass of these dissimilar subcells would give rise to the point-mass of each subgyrador mass ($m_{SGy,i}$). The masses of these $\Delta N_{Th,i}$ subgyradors, each fueled for its gyrations or spinning by a single reactant-thermote, would then make up the consumed reactant mass ($\Delta M_i$). While subgroups of the subgyradors will make up the $m_{Gy}$ mass of each reactant-gyrador with their combined gyrations expected to induce a non-zero volume or bobble for the reactant-gyrador, which does not occur for noreactant-gyradors originating from the DCS. The emergence of the reactant-gyrador bobble would then result in the emergence of a gravitational potential energy ($Gm_{Gy}^2/2r_{Gy,i}$) that will prevent any further increase of the popped bobbles' $i^{th}$ iteration radius ($r_{Gy,i}$). The simple equation given by $r_{Gy,i}=(m_{SGy,i}/M)r$ for the derivation of the radius $r_{Gy,i}$ will be found to emerge. A typical $r_{Gy,i}$ value is extremely small, for instance, it is in the order of $10^{-29}$ m for the running chemical reaction, which is however larger than the Planck constant of $1.6\times10^{-35}$ m. Moreover, equating the kinetic-energy $((m_{Gy}/m_{SGy,i})\times m_{SGy,i}v_{SGy,i}^2/2)$ of the ($m_{Gy}m_{SGy,i}$) subgyradors that form each reactant-gyrador to the emergent gravitational potential energy ($Gm_{Gy}^2/2r_{Gy,i}$)

of each reactant-gyrador and then solving for the orbiting or spinning speed of the subgyrador ($v_{SGy,i}$), the expression $v_{SGy,i}=(Gm_{Gy}/r_{m_{Gy,i}})^{1/2}$ surfaces. The subgyrador speed has been found to be much larger than the gyrador's speed ($v_{Gy}$), for instance, for the illustrative example it would be in the order of $10^3$ m/s for the subgyrador while it is in the order of $10^{-5}$ m/s for the gyrador. Finally, an analytical relationship between $\Delta N_{Th,i}$ and $\Delta M_i$ is derived that surfaces naturally from the integration of the thermotes-based entropy of flexible-phase mediums, first offered in 2014, and the Clausius entropy.

A statement of the $i^{th}$ iteration specific heat capacity equation is first made and then the details of four alternative physical descriptions for it is reviewed, which will then lead to the derivation of the analytical relationship between $\Delta N_{Th,i}$ and $\Delta M_i$.

The dynamic $i^{th}$ iteration specific heat capacity ($SHC_i$) equation is stated according to:

$$SHC_i = \frac{k_B}{2m_{SGy,i}} = \kappa \frac{(\delta Q_i - \delta W_{Free,i})/\delta Q_i}{(N_{DoF}+2)T} = \kappa \frac{\delta W_{Mec,i}/\delta Q_i}{2T} = \frac{k_B \Delta N_{Th,i}}{2\Delta M_i} \quad (94)$$

This equation presents four alternative physical descriptions for $SHC_i$ which are:

In terms of the value of the subgyrador's mass ($m_{SGy,i}$) and the Boltzmann constant ($k_B$).

In terms of the fraction of the heat-energy ($\delta Q_i = \kappa \Delta M_i$) given by (($\delta Q_i - \delta W_{Free,i})/\delta Q_i$) where: a) $\Delta M_i$ is the consumed reactant mass that gives rise to the heat-energy ($\delta Q_i$) through the reactant to heat transducer constant ($\kappa$) whose value is around 20.9 MJ/kg; b) T is the medium's driving temperature; c) $N_{DoF}$ is the number of the medium's degrees of freedom (DoF); and d) $\delta W_{Free,i}$ is the free work-energy contribution of $\delta Q_i$ to the yield of the chemical reaction.

In terms of the fraction of the heat-energy given by $\delta W_{Mec,i}/\delta Q_i$ where $\delta W_{Mec,i}=\Delta Q_i$ is the mechanical work-energy contribution of $\delta Q_i$ to the thermote pressure acting on the thermote volume associated with the number of reactant-thermotes.

In terms of the number of reactant thermotes over the consumed reactant mass ($\Delta N_{Th,i}/\Delta M_i$).

Further details about the four alternative physical descriptions of $SHC_i$ now follow:

The subgyradors produced by the consumed reactant mass: The subgyradors that make up the consumed reactant mass ($\Delta M_i$) are characterized by the following five equations.

The first equation is:

$$e_{SGy,i}=m_{SGy,i}v_{SGy,i}^2/2=e_{Gy}=m_{Gy}v_{Gy}^2/2=e_{Th}=N_{DoF}k_BT/2 \quad (95)$$

where $e_{SGy,i}=m_{SGy,i}v_{SGy,i}^2/2$ is the kinetic-energy of the subgyrador that matches both the gyradors kinetic-energy $e_{Gy}=m_{Gy}v_{Gy}^2/2$ of equation 69 and the thermotes thermal-energy $e_{Th}=N_{DoF}k_BT/2$ of equation 70 extracted from the mediums minimum surface-area (A).

The second equation is:

$$v_{SGy,i}=(m_{Gy}/m_{SGy,i})^{1/2}v_{Gy} \quad (96)$$

which is the subgyradors speed equation derived from equation 95.

The third equation is:

$$E_{SGy,i}=(m_{Gy}/m_{SGy,i})(m_{SGy,i}v_{SGy,i}^2/2)=e_{G,m_{Gy,i}}=Gm_{Gy}^2/2r_{Gy,i} \quad (97)$$

where: a) $E_{SGy,i}=(m_{Gy}/m_{SGy,i})(m_{SGy,i}v_{SGy,i}^2/2)$ is the total kinetic-energy of the $m_{Gy}/m_{SGy,i}$ subgyradors that make up the mass of the reactant-gyrador; b) $E_{SGy,i}$ is set equal to $e_{G,m_{Gy,i}}=Gm_{Gy}^2/2r_{m_{Gy,i}}$ which is the $i^{th}$ iteration gravitational potential energy of the reactant-gyrador with radius ($r_{m_{Gy,i}}$) for its non-zero spherical volume; and c) $E_{SGy,i}=e_{G,m_{Gy,i}}$ denotes a compression gyration-gravity equation (GGE) that counteracts the increase of the reactant-gyrador's volume through the emergent reactant-gyrador's gravitational potential energy $e_{G,m_{Gy,i}}$.

The fourth equation is:

$$v_{SGy,i}=(Gm_{Gy}/r_{m_{Gy,i}})^{1/2}=(m_{Gy}/m_{SGy,i})^{1/2}v_{Gy} \quad (98)$$

where $v_{SGy,i}=(Gm_{Gy}/r_{m_{Gy,i}})^{1/2}$ is the subgyradors speed equation that surfaces from equation 97 which is then integrated with equation 96 to yield equation 98.

The fifth and final equation is:

$$r_{m_{Gy,i}} = \frac{m_{SGy,i}}{M}r \quad (99)$$

where $r_{m_{Gy,i}}$ is the reactant-gyrador's radius derived from equation 98.

The heat produced by the consumed reactant mass: The heat-energy ($\delta Q_i$) that is produced by the change in reactant mass ($\Delta M_i$) is characterized by the following seven equations.

The first equation is:

$$\delta Q_i = \kappa \Delta M_i = \delta E_i + \delta W_{Mec,i} + \delta W_{Free,i} \quad (100)$$

where the heat expression ($\delta Q_i = \kappa \Delta M_i$) has the reactant-heat constant ($\kappa$) multiplying the reactant mass ($\Delta M_i$) to produce the heat-energy ($\delta Q_i$) which is, in turn, composed of three different kinds of contributing energies, namely: the internal-energy ($\delta E_i$), the mechanical work-energy ($\delta W_{Mec,i}$), and the free work-energy ($\delta W_{Free,i}$).

The second equation is:

$$\delta E_i = e_{Th}\Delta N_{Th,i}=(m_{SGy,i}v_{SGy,i}^2/2)N_{SGy,i}=(m_{SGy,i}v_{SGy,i}^2/2)\Delta N_{Th,i} \quad (101)$$

where $\delta E_i = e_{Th}\Delta N_{Th,i}$ is the internal-energy contributed by $\Delta N_{Th,i}$ reactant-thermotes which fuels the kinetic-energy of all subgyradors ($m_{SGy,i}v_{SGy,i}^2N_{SGy,i}/2$) whose number ($N_{SGy,i}$) is the same as the number of reactant-thermotes ($\Delta N_{Th,i}$).

The third equation is:

$$\delta W_{Mec,i}=k_BT\Delta N_{Th,i}=P_{Th}\Delta v_{Th,i} \quad (102)$$

where $\delta W_{Mec,i}=k_BT\Delta N_{Th,i}$ is the thermal-energy which fuels the reactant's mechanical work-energy ($P_{Th}\Delta V_{Th,i}$) pressing on the reactant-thermotes volume ($\Delta V_{Th,i}$) with the medium's thermote-pressure ($P_{Th}$).

The fourth equation is the number of medium-thermotes ($N_{Th}$):

$$N_{Th}=E/e_{Th}=Mc^2/e_{Th} \quad (103)$$

where $E=Mc^2$ is the mass-energy equation and equation 70 gives $e_{Th}$.

The fifth equation is:

$$P_{Th}V=k_BTN_{Th} \quad (104)$$

which is the thermotes' energy equation of state (EEOS) of the medium where the thermal-energy ($k_BTN_{Th}$) fuels the medium's mechanical work-energy ($P_{Th}V$) that presses on the medium-thermotes volume (V) with the thermotes pressure ($P_{Th}$).

The sixth equation is:

$$\delta W_{Free,i}=\delta Q_i-\delta E_i-\delta W_{Mec,i}=\delta Q_i-\delta H_i=\delta Q_i-((N_{DoF}+2)/2)\delta W_{Mec,i} \quad (105)$$

where $\delta Q_i - \delta E_i - \delta W_{Mec,i}$ is the thermal-energy that fuels the free work-energy ($\delta W_{Free,i}$) responsible for the yield of the chemical reaction and $\delta H_i = \delta E_i + \delta W_{Mec,i} = \delta Q_i - \delta W_{Free,i} = ((N_{DoF}+2)/2)\beta W_{Mec,i}$ is the thermotes enthalpy of the medium.

The seventh and last equation is:

$$\kappa = \frac{\delta Q_i}{\Delta M_i} = \frac{(N_{DoF}+2)T \times SHC_i}{(\delta Q_i - \delta W_{Free,i})/\delta Q_i} = \frac{2T \times SHC_i}{\delta W_{Mec,i}/\delta Q_i} \cong \frac{(N_{DoF}+2)T \times SHC}{(\delta Q - \delta W_{Free})/\delta Q} = \frac{2T \times SHC}{\delta W_{Mec}/\delta Q} \quad (106)$$

which expresses the reactant to heat transducer constant ($\kappa = \delta Q_i/\Delta M_i$) in terms of, namely: the 'on-line' $i^{th}$ iteration specific-heat-capacity $SHC_i$, heat-energy $\delta Q_i$, free work-energy $\delta W_{Free,i}$, and mechanical work-energy $\delta W_{Mec,i}$ physical variables under non-equilibrium conditions; and the 'experimental off-line' steady-state specific-heat-capacity SHC, heat-energy $\delta Q$, free work-energy $\delta W_{Free}$, and mechanical work-energy $\delta W_{Mec}$ variables for use in the experimental finding of $\kappa$ under equilibrium conditions. The value of K is generally within ±2% of 20.9 MJ per kg in one considered example but may be within ±5% in another example. In one example, the value used for $\kappa$ is optimized within this range by optimizing for the yield of the desired product.

The Number of Reactant-Thermotes Produced by the Consumed Reactant Mass.

Introductory words: The number of reactant-thermotes ($\Delta N_{Th,i}$) produced by the consumed reactant mass ($\Delta M_i$) can be found for flexible-phase mediums from an analytical function that allows the straightforward finding of $\Delta N_{Th,i}$ from the measured $\Delta M_i$. An example of a chemical reaction that can be modeled as a flexible-phase medium is one that uses water, whose molecules are diatomic, as the solvent. The analytic function is stated next and then a proof is given that departs from the thermotes-based entropy of a flexible-phase medium.

Statement of the number of reactant-thermotes equation (NRTE): The statement of the $i^{th}$ iteration NRTE that relates the number of reactant-thermotes ($\Delta N_{Th,i}$) to the $i^{th}$ iteration change in reactant mass ($\Delta M_i$) is given by:

$$\Delta N_{Th,i} = \frac{\kappa \Delta M_i / k_B T}{2\ln\left(\frac{M}{\Delta M_i}\right) + 1 - \frac{\ln(q) + \frac{N_{DoF}}{2} - 2\ln\left(\frac{M}{\Delta M_i}\right)}{\ln(N_{Th}) - 1}} \quad (107)$$

where all the constants and non-iterative variables in this equation were earlier defined except for q which is the medium's partition function stated as:

$$q = \sum_{i=1}^{L} g_i e^{-\varepsilon_i/k_B T} \quad (108)$$

where $\varepsilon_i$ is the $i^{th}$ energy state of L possible levels and $g_i$ is the number of degeneracies of $\varepsilon_i$. An important special case of the partition function equation 108 corresponds to a medium composed of diatomic molecules such as water molecules. For this case the partition function would then be given according to:

$$q = (k_B T)^{\frac{N_{DoF}}{2}} \left(\frac{m}{2\pi}\right)^{\frac{3}{2}} \frac{2I}{\sigma \hbar^5} V \quad (109)$$

where: a) m is the mass of the diatomic molecule; b) $\sigma$ is the molecule's symmetry value; c) 'I' is the molecule's average moment of inertia; d) V is the volume of the medium; and e) h is the reduced Planck constant.

Derivation of NRTE: The derivation of the NRTE starts with the statement of the thermotes-based entropy (S) of a flexible-phase medium. This entropy is given by:

$$S = k_B N_{Th} \ln\left(\frac{e^{\frac{N_{DoF}}{2}+\eta} q}{N_{Th}^{\eta}} = \frac{V}{\Delta V}\right) \quad (110)$$

where:
q is the mediums partition function;
$\eta$ is the thermotes indistinguishability factor (TIF) of the medium given by:

$$\eta = \left(\ln q + \frac{N_{DoF}}{2} - \ln\left(\frac{V}{\Delta V}\right)\right) / \ln\left(\frac{N_{Th}}{e}\right) \le 1. \quad (111)$$

V is the mediums spherical volume with its radius (r) related to the surface-area (A) and the gyrador's constant orbiting-speed ($v_{Gy}$) of equation 68 according to:

$$V = (r/3)A, \quad (112)$$

$$A = 4\pi r^2, \quad (113)$$

$$r = GM/v_{Gy}^2, \quad (114)$$

with equation 114 displaying the orbiting radius (r) for all the gyradors of the mediums as a function of the constant orbiting-speed ($v_{Gy}$) about the point-mass of the initial system mass (|M|) at the radial distance (r) from the center of the spherical initial system mass where its point-mass resides.

$\Delta V$ is the quantum of operation (QoO) version of the V, A, and r equations 112, 113, 114 below:

$$\Delta V = (r/3)\Delta A \quad (115)$$

$$\Delta A = 4\pi \Delta r^2 \quad (116)$$

$$\Delta r = G\Delta M/v_{Gy}^2 \quad (117)$$

with equation 117 displaying the orbiting radius ($\Delta r$) for all the reactant-gyradors of the medium as a function of the constant orbiting-speed ($v_{Gy}$) about the point-mass of the change in reactant mass (|$\Delta M$|) at the radial distance ($\Delta r$) from the center of the assumed spherical reactant mass where its point-mass resides, and also with these reactant-gyradors simultaneously orbiting with the same constant orbiting-speed ($v_{Gy}$) the point-mass of the initial system mass (|M|) at the radial distance (r) from the center of the spherical initial system mass where its point-mass resides.

Next making use of the three QoO volume ($\Delta V$) equations 115, 116 and 117, the three volume (V) equations 112, 113, 114, and the entropy (S) equation 110, the following two $\Delta V$ relationships surface:

$$\Delta V = \frac{N_{Th}^{\eta}}{e^{\frac{N_{DoF}}{2}+\eta} \times q/V} = \frac{N_{Th}^{\eta}}{e^{\frac{N_{DoF}}{2}+\eta} \times (k_B T)^{\frac{N_{DoF}}{2}} \left(\frac{m}{2\pi}\right)^{\frac{3}{2}} \frac{2I}{\sigma \hbar^5}} \quad (118)$$

$$\Delta V/V = \Delta A/A = \Delta r^2/r^2 = \Delta M^2/M^2 \quad (119)$$

where in equation 118 the partition function for diatomic molecules given by equation 109 has been used.

Next the Clausius QoO entropy $\Delta S=\delta Q/T$ where $\delta Q$ is the heat-energy of equation 100 generated by the reactant mass ($\Delta M$) and T is the mediums temperature, is expanded as follows:

$$\Delta S = \frac{\delta Q}{T} = \frac{\kappa \Delta M}{T} = [S]_{\substack{N_{Th} \to N_{Th}+\Delta N_{Th} \\ V \to V+\Delta V_{Th}}} - S \tag{120}$$

where the variable $$[S]_{\substack{N_{Th} \to N_{Th}+\Delta N_{Th} \\ V \to V+\Delta V_{Th}}}$$

in equation 120 indicates an increase in the mediums entropy (S) by $\Delta S$ that is driven by the change in reactant mass ($\Delta M$) which results in the addition of the number of reactant-thermotes ($\Delta N_{Th}$) to the number of medium-thermotes ($N_{Th}$). In turn, the $\Delta N_{Th}$ change in the number of thermotes of the medium would require its volume (V) to change by a $\Delta V_{Th}$ amount. This change in the medium's volume ($\Delta V_{Th}$) would be ruled by the following ratio:

$$\Delta N_{Th}/N_{Th}=\Delta V_{Th}/V \tag{121}$$

which naturally emerges when the two mechanical work-energy expressions given in equations 102 and 104, i.e., $P_{Th}\Delta V_{Th}=k_B T \Delta N_{Th}$ and $P_{Th}V=k_B T N_{Th}$, are combined into one.

Next after incrementing the mediums number of thermotes and volume in the entropy equation 110 and also making use of equation 121 the following result follow for the incremented entropy:

$$[S]_{\substack{N_{Th} \to N_{Th}+\Delta N_{Th} \\ V \to V+\Delta V_{Th}}} = k_B(N_{Th}+\Delta N_{Th}) \tag{122}$$

$$\ln\left(\frac{e^{\frac{N_{DoF}}{2}+\eta}q \times (V+\Delta V_{Th})/V}{(N_{Th}+\Delta N_{Th})^\eta} = \frac{e^{\frac{N_{DoF}}{2}+\eta}q \times (1+\Delta N_{Th}/N_{Th})}{N_{Th}^\eta (1+\Delta N_{Th}/N_{Th})^\eta}\right) =$$

$$k_B(N_{Th}+\Delta N_{Th})\ln\left(\frac{e^{\frac{N_{DoF}}{2}+\eta}q}{N_{Th}^\eta} = \frac{V}{\Delta V}\right) +$$

$$k_B \Delta N_{Th}\left(1+\frac{N_{Th}}{\Delta N_{Th}}\right)\ln\left(1+\frac{\Delta N_{Th}}{N_{Th}}\right)^{1-\eta} = S + k_B\Delta N_{Th}\ln\left(\frac{V}{\Delta V}\right)+$$

$$k_B\Delta N_{Th}(1-\eta)\left(1+\frac{N_{Th}}{\Delta N_{Th}}\right)\ln\left(1+\frac{\Delta N_{Th}}{N_{Th}}\right) = S + \Delta S$$

where the prior to last term seen in equation 122 yields the Clausius QoO entropy $\Delta S$ as:

$$\Delta S = \tag{123}$$
$$\frac{\delta Q}{T} = \frac{\kappa \Delta M}{T} = k_B \Delta N_{Th}\left(\ln\left(\frac{V}{\Delta V}\right)+(1-\eta)\left(1+\frac{N_{Th}}{\Delta N_{Th}}\right)\ln\left(1+\frac{\Delta N_{Th}}{N_{Th}}\right)\right)$$

Next equation 123 is simplified to yield:

$$\frac{\kappa \Delta M}{k_B T \Delta N_{Th}} = \ln\left(\frac{V}{\Delta V}\right)+(1-\eta)\left(1+\frac{N_{Th}}{\Delta N_{Th}}\right)\ln\left(1+\frac{\Delta N_{Th}}{N_{Th}}\right). \tag{124}$$

Next making use of equation 119 in the entropy equation 124 and also the TIF equation 111 one then arrives at the following expression:

$$\frac{\kappa \Delta M}{k_B T \Delta N_{Th}} = \tag{125}$$
$$2\ln\left(\frac{M}{\Delta M}\right)+\left(1-\frac{\ln q + \frac{N_{DoF}}{2}-2\ln\left(\frac{M}{\Delta M}\right)}{\ln(N_{Th})-1}\right)\left(1+\frac{N_{Th}}{\Delta N_{Th}}\right)\ln\left(1+\frac{\Delta N_{Th}}{N_{Th}}\right)$$

that relates the number of reactant-thermotes ($\Delta N_{Th}$) to fundamental medium variables, namely: a) its mass (M); b) its temperature (T); c) its number of medium-thermotes ($N_{th}$); d) its partition function (q); and e) its change in reactant mass ($\Delta M$).

Equation 125 can be further simplified by noticing that the term $(1+N_{Th}/\Delta N_{Th})\ln(1+\Delta N_{Th}/N_{Th})$ appearing in equation 125 approaches the value of one according to:

$$\left[\left(1+\frac{N_{Th}}{\Delta N_{Th}}\right)\ln\left(1+\frac{N_{Th}}{N_{Th}}\right)\right]_{\substack{\Delta N_{Th} \\ N_{Th}} \to 0} \cong \left(1+\frac{N_{Th}}{\Delta N_{Th}}\right)\frac{\Delta N_{Th}}{N_{Th}} = \tag{126}$$

$$1+\frac{\Delta N_{Th}}{N_{Th}} \cong 1$$

This simplification results because in applications the value of $\Delta N_{Th}/N_{Th}$ is extremely small as seen, for instance, in the specification section for an industrial chemical reaction where it is found that $\Delta N_{Th}/N_{Th}=1.86095\times 10^{26}/1.12328\times 10^{38}=1.6565771\times 10^{-12}$ when the mass of the medium is 15.21 kg, the reactant mass is 0.340 kg, T=353 K, and liquid water is used as the solvent; in equation 126 use was made of the approximation $\ln(1+\Delta N_{Th}/N_{Th})\cong \Delta N_{Th}/N_{th}$ that occurs when $\Delta N_{Th}/N_{Th}$ is a very small value, as is noted from the Taylor Series expansion $\ln(1+x)=x-x^2/2+\ldots$. Using equation 126 in equation 125 the following simpler expression emerges:

$$\frac{\kappa \Delta M}{k_B^T \Delta N_{Th}} = 2\ln\left(\frac{M}{\Delta M}\right)+1-\frac{\ln q+\frac{N_{DoF}}{2}-2\ln\left(\frac{M}{\Delta M}\right)}{\ln(N_{Th})-1}. \tag{127}$$

Finally, equation 127 is solved for $\Delta N_{Th}$ which then results in the sought-after equation 107 for the $i^{th}$ iteration case.

Specific Heat Capacity Finding from Subgyradors Driven by Reactant Generated Thermotes In summary, the $i^{th}$ iteration dynamic specific heat capacity $SHC_i$ of the chemical reaction can be found making use of the following general expression:

$$SHC_i = \frac{k_B}{2m_{SG_{y,i}}} = \frac{k_B \Delta N_{Th,i}}{2\Delta M_i} = \frac{\kappa}{2T} \times \frac{\delta W_{Mec,i}}{\delta Q_i} \tag{128}$$

$$\kappa = \delta Q_i/\Delta M_i \tag{129}$$

$$\delta W_{Mec,i} = P_{Th}\Delta V_{Th,i} = k_B T \Delta N_{Th,i} \tag{130}$$

$$P_{Th}V = k_B T\, N_{Th} \tag{131}$$

where: a) T is the driving temperature of the medium; b) V is the volume of the entire medium where $N_{Th}$ thermotes reside and $\Delta V_{Th,i}$ is the $i^{th}$ iteration volume part of the medium where $\Delta N_{Th,i}$ thermotes reside; c) $P_{Th}\Delta V_{Th,i}=k_B T\Delta N_{Th,i}$ denotes the QG-LTT's $i^{th}$ iteration number of reactant-thermotes ($\Delta N_{Th,i}$) equation of state (EOS) of the medium where $P_{Th}$ is the pressure that acts on the medium's $N_{Th}$ thermotes according to the QG-LTT's number of thermotes ($N_{Th}$) EOS given by $P_{Th}V=k_B T N_{Th}$; d) κ is a constant that serves as a conversion factor in SI J/kg units between the change in reactant mass ($\Delta M_i$) and the heat-energy ($\delta Q_i$) that it generates; and e) $\delta W_{Mec,i}$ is the $i^{th}$ iteration mechanical-work energy that is one of three types of energies that make up the heat energy ($\delta Q_i$), the two other types are the free-work energy $\delta W_{Free,i}$ and the internal-energy ($\delta E_i$). More specifically, the heat energy ($\delta Q_i$) is given according to:

$$\delta Q_i = \kappa \Delta M_i = \delta E_i + \delta W_{Mec,i} + \delta W_{Free,i} \quad (132)$$

$$\delta E_i = e_{Th}\Delta N_{Th,i} = (N_{DoF}k_B T/2)\Delta N_{Th,i} \quad (133)$$

$$\delta W_{Mec,i} = k_B T\Delta N_{Th,i} \quad (134)$$

$$\delta W_{Free,i} = \delta Q_i - \delta E_i - \delta W_{Mec,i} \quad (135)$$

where the added/subtracted internal-energy ($\delta E_i$) to/from the medium contributed by ($\delta Q_i$) is noted to be larger by a factor of $N_{DoF}/2$ than the mechanical-energy ($\delta W_{Mec,i}$) which is often in the range from 9% to 16% of $\delta Q_i$. A desired use of this range of likely values for $\delta W_{Mec,i}/\delta Q_i$ is to experimentally find a proper value for κ which as seen from equation 106 is given by the expression:

$$\kappa = \frac{2T \times SHC_i}{\delta W_{Mec,i}/\delta Q_i}. \quad (136)$$

As shown in Table 5, the value of κ shows minimal dependency on the reaction conditions. For example, biochemical reactions typically utilize around 9% of the total heat in mechanical work (9.27%, 9.44% and 9.91% in Table 5) and around 66% of the total heat in free work (67.555%, 66.960% and 65.315% in Table 5). Other reactions may utilize around 15% of the total heat in mechanical work (12.76%, 14.25% and 15.53% in Table 5) and around 50% of the total heat in free work (55.38%, 50.18% and 45.70% in Table 5).

CONCLUDING REMARKS

The utility of the disclosed lingerature control methods for chemical reactions under non-equilibrium conditions is that they offer efficient and affordable dynamical steps for the regulation of all different kinds of reactions, steps perceived by looking through the lens of an ascending Quantum Gravity Linger-Thermo Theory (QG-LTT). A theory characterized by an enabling quantum of thermal-energy, the thermote, as well as two distinct quantums of mass, the gyradors and subgyradors formed respectively by dissimilar-cells and subcells that are created, exist, die, or otherwise exit the medium. The regulation steps for lingerature control presented in this application were not available before because the QG-LTT of physics from which they arise is an innovative theoretical revelation in physics that has disclosed 'quantum gravitational first principles' that govern the behavior of chemical reactions. Five modeling studies are further suggested to enhance the already derived results. They are: 1) to model the distribution of the medium's dissimilar-cells and subcells leading to the effective regulation of a medium's lingerature; 2) to model the lingerature amounts that conform with the range of temperatures and iteration times that characterizes the controlled chemical reaction; 3) to model the volume of the mixtures needed to achieve a desirable outcome as well as desired lingerature conditions; 4) to model the gyrador and subgyrador masses of the medium to achieve a desirable outcome; and 5) to model the evolutionary processing stages of biological and astrophysical mediums through the QG-LTT lens that guides the efficient and affordable practical designs of this application.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

TABLE 5

| $\Delta M_i$ (kg) | $\dfrac{\delta W_{Mec,i}}{\delta Q_i}$ | $\dfrac{\delta W_{Free,i}}{\delta Q_i}$ | $T_i$ (K) | $SHC_i$ ($K^{-1}g^{-1}$) | $\kappa = \dfrac{2T \times SHC_i}{\dfrac{\delta W_{Mec,i}}{\delta Q_i}}$ (MJ $kg^{-1}$) | Deviation from 20.9 Mj $kg^{-1}$ |
|---|---|---|---|---|---|---|
| 0.3628 | 9.27% | 67.555% | 310 | 3.124 | 20.89 | −0.03% |
| 0.4000 | 9.44% | 66.960% | 310 | 3.182 | 20.90 | −0.01% |
| 0.4691 | 9.91% | 65.315% | 310 | 3.282 | 20.53 | −1.76% |
| 0.3400 | 12.76% | 55.38% | 353 | 3.779 | 20.91 | 0.04% |
| 0.5950 | 14.25% | 50.18% | 353 | 4.219 | 20.90 | 0.01% |
| 0.6800 | 15.53% | 45.70% | 353 | 4.660 | 21.18 | 1.36% |

Thus, the constant κ is generally about 20.9 MJ per kg but may be within ±5% or, in another embodiment, within ±2% of 20.9 MJ per kg. In one embodiment, the value used for κ is optimized within this range by optimizing for the yield of the desired product.

What is claimed is:

1. A method for controlling lingerature of a chemical reaction, the method comprising steps of:
 a) determining an initial system mass (M) of a chemical system which performs a chemical reaction between reactants in a solvent to produce products, wherein at least one of the products is an exiting product that is a gaseous product, a precipitation product, the chemical reaction having a desired temperature (T), a desired lingerature ($\tau$) and the chemical system having a specific heat capacity (SHC);

b) adding the reactants and the solvent to a vessel, thereby initiating the chemical reaction;

c) allowing the exiting product to exit the vessel;

d) measuring a current system mass ($M_i$);

e) determining an exited mass ($E_i$) of the exiting product that exited during step c) based on the current system mass ($M_i$);

f) calculating a change in reactant mass ($\Delta M_i$) that occurred based on the exited mass ($E_i$);

g) calculating a dynamic lingerature ($\tau_i$) according to:

$$\tau_i = \beta \left( \frac{M - \Delta M_i}{M} \right)^2 \tau$$

if the chemical reaction is an exothermic reaction or according to:

$$\tau_i = 2\tau - \beta \left( \frac{M - \Delta M_i}{M} \right)^2 \tau$$

if the chemical reaction is an endothermic reaction, wherein $\beta$ is a number between 0.8 and 1.2;

h) calculating a change in lingerature ($\Delta \tau_i$) based on the desired lingerature ($\tau$) and the dynamic lingerature ($\tau_i$);

i) adding additional mass to the vessel in an amount equal to the exited mass ($E_i$);

j) adjusting a temperature of the chemical system by adding or removing an amount of heat ($\Delta Q_i$) according to:

$$\Delta Q_i = SHC \times M \times \left( 1 - \alpha \sqrt{\frac{(1 + \Delta \tau_i / \tau)}{\beta}} \right) T$$

if the chemical reaction is an exothermic reaction or according to:

$$\Delta Q_i = SHC \times M \times \left( \alpha \sqrt{\frac{(1 - \Delta \tau_i / \tau)}{\beta}} - 1 \right) T$$

if the chemical reaction is an endothermic reaction, wherein $\alpha$ is a number between 0.8 and 1.2; and k) iteratively repeating steps c) to j).

2. The method as recited in claim 1, wherein the chemical reaction is exothermic and the calculating the dynamic lingerature ($\tau_i$) performs the calculating according to:

$$\tau_i = \beta \left( \frac{M - \Delta M_i}{M} \right)^2 \tau;$$

and the adjusting the temperature of the chemical system adjusts the temperature by removing the amount of heat ($\Delta Q_i$) according to:

$$\Delta Q_i = SHC \times M \times \left( 1 - \alpha \sqrt{\frac{(1 + \Delta \tau_i / \tau)}{\beta}} \right) T.$$

3. The method as recited in claim 2, wherein $\beta$ is a number between 0.95 and 1.05.

4. The method as recited in claim 2, wherein $\alpha$ is a number between 0.95 and 1.05.

5. The method as recited in claim 1, wherein the chemical reaction is endothermic and the calculating the dynamic lingerature ($\tau_i$) performs the calculating according to:

$$\tau_i = 2\tau - \beta \left( \frac{M - \Delta M_i}{M} \right)^2 \tau;$$

and the adjusting the temperature of the chemical system adjusts the temperature by adding the amount of heat ($\Delta Q_i$) according to:

$$\Delta Q_i = SHC \times M \times \left( \alpha \sqrt{\frac{(1 - \Delta \tau_i / \tau)}{\beta}} - 1 \right) T.$$

6. The method as recited in claim 5, wherein $\beta$ is a number between 0.95 and 1.05.

7. The method as recited in claim 5, wherein $\alpha$ is a number between 0.95 and 1.05.

8. The method as recited in claim 1, wherein the exiting product is a gaseous product.

9. The method as recited in claim 1, wherein $\alpha$ and $\beta$ are both 1.

10. The method as recited in claim 1, wherein specific heat capacity (SHC) is a dynamic specific heat capacity (SHC) found according to:

$$SHC_i = \frac{k_B}{2 m_{SG_y, i}}$$

wherein $k_B$ is a Boltzmann constant $k_B$ and $m_{SG_y,i}$ is a $i^{th}$ iteration subgyrador mass.

* * * * *